United States Patent [19]

Kanai et al.

[11] Patent Number: 5,388,016
[45] Date of Patent: Feb. 7, 1995

[54] MAGNETIC TAPE DATA MANAGEMENT METHOD AND APPARATUS

[75] Inventors: Sadasaburoh Kanai; Hiroyuki Kitajima, both of Yokohama; Toshifumi Nishimura, Minamiashigara; Katsuharu Kakuse, Hadamo; Minoru Kosuge, Odawara, all of Japan

[73] Assignee: Hitachi, Ltd., Tokyo, Japan

[21] Appl. No.: 843,213

[22] Filed: Feb. 28, 1992

[30] Foreign Application Priority Data

Mar. 8, 1991 [JP] Japan .................................. 3-069197

[51] Int. Cl.⁶ .............................................. G11B 15/18
[52] U.S. Cl. .................................... 360/72.1; 360/72.3
[58] Field of Search ................... 360/72.1, 72.2, 72.3, 360/27, 31, 33.1

[56] References Cited

U.S. PATENT DOCUMENTS

| 4,951,276 | 8/1990 | Sakaegi et al. | 360/72.1 |
| 5,038,231 | 8/1991 | Harigaya et al. | 360/72.2 |
| 5,081,548 | 1/1992 | Inazawa et al. | 360/72.2 |

FOREIGN PATENT DOCUMENTS 55-58862 1/1980 Japan .

OTHER PUBLICATIONS

Tada and Fushiki: "Format for using DAT for recording code data, a proposal made jointly by Sony and Hewlett-Packard", Nikkei Electronics, Mar. 7, 1988, No. 442, pp. 145–148.

Fushiki: "IG-byte magnetic tape subsystem for esternal storage using DAT tape", Nikkei Electronics, Jun. 15, 1987, No. 423, p. 77.

Suzuki, Oyama and Yoshizawa: "Next-generation VTR to use digital recording", Nikkei Electronics, May 30, 1988, No. 448, pp. 111–137.

Primary Examiner—Edward K. Look
Assistant Examiner—Christopher Verdier
Attorney, Agent, or Firm—Fay, Sharpe, Beall, Fagan, Minnich & McKee

[57] ABSTRACT

A magnetic tape data management method and apparatus is described that reduces the access time for updating and referring to directory data. At the time of accessing data on a magnetic tape loaded in a magnetic tape subsystem, directory data for the magnetic tape is, in response to the completion of the processing of data, recorded in a region located near the place at which the magnetic tape head is positioned at that time, said region constituting a directory data region (DDR). Further, a directory data memory for recording directory data from the magnetic tape is provided in the magnetic tape subsystem, remote from the tape. At the time of accessing data on the magnetic tape loaded in the magnetic tape subsystem, directory data for the magnetic tape processing is, in response to completion of the processing of data, recorded in the directory data memory in the magnetic tape subsystem.

51 Claims, 8 Drawing Sheets

MAGNETIC TAPE DATA MANAGEMENT METHOD AND APPARATUS

BACKGROUND OF THE INVENTION

This invention relates to a magnetic tape data management method and data storage subsystem.

Recent years have seen an expansion in the scale of computer systems, along with a rapid increase in the amount of data stored by such systems. In a computer system, various types of data are stored in external storage subsystems employing magnetic disks, magnetic tape and other types of storage media. As the amount of storage and data increases, the number of external storage subsystems and the number of storage media used by the system both increase, generating more system management and operational work, raising costs, increasing the amount of space occupied by the system, and giving rise to various other problems. Being a storage medium with high portability, magnetic tape has experienced a particularly large increase in utilization as a backup medium for data stored on magnetic disks and as a medium for permanent data storage. The amount of magnetic tape used in computer systems has thus been increasing steadily. The aforesaid problems are further aggravated by the fact that progress in increasing medium storage capacity has been slower for magnetic tape than for magnetic disks, which have already achieved high capacity levels.

One solution to these problems is to use digital audio tape recorders (DATs) or digital video tape recorders (VTRs) as computer external storage subsystems (see Tada and Fushiki, "Format For Using DAT For Recording Code Data, a proposal made jointly by Sony and Hewlett-Packard" Nikkei Electronics Mar. 7, 1988, No. 442, pp. 145-148, Fushiki, "One G-Byte Magnetic Tape Subsystem for External Storage Using DAT Tape", Nikkei Electronics, Jun. 15, 1987, No. 423, p. 77, Suzuki, Oyama, and Yoshizawa "Next-Generation VTR To Use Digital Recording" Nikkei Electronics, May 30, 1988, No. 448, pp 111-137, particularly page 128.)

Compared with the magnetic tape conventionally used for computer external storage, DAT and digital VTR recording media have the advantages of higher capacity, smaller size and lower cost. Digital VTR tape is specially advantageous. While about twice the size of the small cartridge type magnetic tape used in general purpose computers, it has about 100 times the recording capacity and, with a cost per unit capacity that is 10 to several 10s of times lower, is extremely inexpensive. Because of these features, the use of digital VTRs as magnetic tape subsystems for external computer storage is expected to substantially increase.

However, the following problems arise when conventional magnetic tape subsystem technology is applied without modification to digital VTRs.

Since the nature of magnetic tape subsystems requires them to employ sequential or serial access, read/write operations to the magnetic tape have to be carried out sequentially in the forward or reverse direction. Therefore, when the program of the host data processing unit wants to access data at an intermediate or middle portion of the magnetic tape, the fact that access is sequential makes it necessary for the magnetic tape subsystem to find the beginning of the particular data area concerned by starting at the beginning of the tape and sequentially positioning the tape with respect to the magnetic head at the magnetic tape marks written at the beginning and end of each data area, skipping over the data areas between the beginning of the magnetic tape and the data area desired. However, since the capacity of digital VTR tape is large and many data areas are apt to be stored on each reel, a long time is required for accessing specific areas by the conventional technique.

In the case of a digital VTR tape, it is possible to carry out a high speed search by using identifiers for specifying physical positions on the magnetic tape. The aforementioned problem can thus be overcome by storing data referring to positions on the magnetic tape as magnetic tape directory data and using the position data for rapidly locating a position of the desired data.

Methods usable for storing the directory data containing tape position data include one in which the program of the host data processing unit manages the directory data and one in which the directory data is stored in memory on the storage subsystem using a separate digital VTR for storing only directory data. The first method has the drawback of requiring a special digital VTR interface and the drawback of involving read/write to a digital VTR connected with another data processing unit, while the second method is disadvantageous in that it requires read/write to tape in a separate digital VTR.

While it is preferable to use a method in which the directory data is recorded on the data storage medium itself, recording the directory data at a specific single place on the magnetic tape makes it necessary to access this part of the tape every time the directory data is to be updated or referred to. This gives rise to performance and reliability problems. Further, a digital VTR magnetic tape cassette can be loaded/unloaded relative to the magnetic tape subsystem without rewinding the tape back to the beginning. Therefore, with the aforesaid method of recording the directory data at a specified single place, considerable time is required for locating the directory after the magnetic tape is loaded in the magnetic tape subsystem.

For overcoming these problems, it has been known to store data related to the magnetic tape on an IC card or the like coupled with the recording medium as set out in Japanese Laid-Open in which an electronic memory circuit for storing position data relative to a cassette-type magnetic tape is provided integrally within the cassette.

The device disclosed in the above-mentioned Japanese Laid-Open Application No. 55-58862 requires an IC card or other such electronic memory circuit to be affixed to every cassette or medium and also requires a circuit in the magnetic tape storage subsystem for connection with the electronic memory circuit and/or read/write of data. This tends to increase the overall size and complexity of the subsystem.

On the other hand, as regards the method in which directory data containing position data is recorded on the medium (magnetic tape), the following problems arise:

(1) As was explained earlier, when the directory data is recorded at a specific single place on the magnetic tape, this place has to be accessed every time the directory data is to be updated. Further, a digital VTR magnetic tape cassette can be loaded/unloaded relative to the magnetic tape subsystem without rewinding the tape back to the beginning. Thus, once the magnetic tape has been loaded in the magnetic tape subsystem, it has to be wound forward or backward to the specified place at which the directory data is recorded. This takes considerable time. The first problem with recording directory data at a specified single place on the magnetic tape is thus that a long access time is required for directory data updating or reference.

(2) As digital VTR magnetic tape is inferior in durability to the magnetic tape conventionally used in computer systems, it tends to deteriorate quickly at portions where repeated read/write operations are conducted. Since recording of the directory data at a specific single portion of the tape leads to many read/write operations being conducted at this portion, it may become impossible to read/write directory data there. In such a case, the impossibility of reading or writing directory data makes it impossible to access the data recorded at other portions of the tape even though normal read/write of data is possible in the physical sense. Thus, the second problem with recording directory data at a specified single place on the magnetic tape is that the reliability of the system becomes highly dependent on the durability of the tape.

(3) If the directory data is recorded at a plurality of places on the magnetic tape, the place at which new directory data is recorded will not be the only place containing directory data since other portions where old directory data is recorded also exist on the tape. Therefore, when the magnetic tape is loaded in a different magnetic tape subsystem from the one used for recording directory data or when read/write is conducted by a magnetic tape subsystem that becomes faulty before the recording of directory data, the tape may be erroneously positioned at a place recorded with the wrong (not the latest) directory data.

(4) When data regarding positions on the magnetic tape and the like are recorded as directory data, the amount of such directory data becomes voluminous owing to the large capacity of a digital VTR magnetic tape. As a result, a long time is required for the directory data input/output processing.

(1) The durability of digital VTR magnetic tape being inferior to that of conventional tape used in a computer system, portions of the tape which repeatedly come in contact with the magnetic head for read/write of not only directory data but also of ordinary data tend to deteriorate quickly.

To overcome the aforesaid problems without a need for adding complex circuits, the invention has the following objects.

The first object of the invention is to provide a method of recording directory data on a magnetic tape which reduces the access time during updating (writing) and reference to (reading) the directory data.

The second object of the invention is to provide a method of recording directory data on magnetic tape which makes it possible to read/write with respect to portions of the magnetic tape at which directory data is recorded for approximately the same time (tape service life) normally possible to read/write with respect to other portions of the magnetic tape.

The third object of the invention is to provide a method of recording directory data on a magnetic tape which makes it possible to position the tape with respect to the read/write head accurately at the portion of the tape where the latest valid directory data is stored even though directory data is recorded at a plurality of places on the tape. References to "positioning the tape" in this specification should be understood to refer to positioning of the tape with respect to a magnetic tape head.

The fourth object of the invention is to shorten the time for input/output processing of directory data by reducing the amount of such data.

The fifth object of the invention is to prevent rapid deterioration of the magnetic tape by insuring uniform use of all portions thereof.

1) For achieving objects one and two mentioned above, the invention provides the following methods of recording directory data:

a. After accessing data on the magnetic tape, directory data including data regarding the position of data on the tape is recorded in a directory data region (DDR) of the tape near the place on the tape at which the magnetic head is positioned at the time processing of data has been completed. In the preferred embodiment "near" means "closest to and after". "Closest to an after" refers to the nearest available DDR downstream on the tape (opposite of the direction of travel of the tape). Remember, the head axis is fixed (even if rotary) and the tape moves past the head so "after" is defined by position, relative to the fixed head, of the tape. In the preferred embodiment, the nearest DDR is immediately after the head location when processing is finished regardless of whether the tape is preformatted with allocated DDRs or whether DDRs can be written on any available tape space. Of course, reverse reading and writing is possible so "closest to and before" is also envisioned as within the scope of the present invention in addition to "closest to and after".

The specification and claims refer to data directory regions and data regions. It is important to define "region" as either a predetermined region having a fixed length or as a randomly selected, random length region on any portion of the tape. Whether the tape is preformatted or initialized with dedicated regions or whether no dedicated regions exist, the area where data and directory data are written can be defined as a "region".

b. A memory for recording directory data is also provided in the magnetic tape subsystem, removed from the tape itself, and directory data relating to the magnetic tape is recorded there in response to completion of data processing. Before the magnetic tape is unloaded from the magnetic tape subsystem, the directory data relating to the tape is read from the directory data memory in the magnetic tape subsystem and is recorded in a region of the tape "near" the place at which the magnetic tape is positioned just before unloading the tape. In the preferred embodiment, "near" means closest to and after. When the magnetic tape is loaded in the magnetic tape subsystem, the latest directory data relating to the tape is read from the region on the tape where it is stored and written to the directory data memory in the subsystem.

c. The region of the magnetic tape for recording the directory data is defined as any free tape area near the place where the magnetic is positioned at the time of concern when the tape is used with no predefined areas or as one of a plurality of directory data regions established on the magnetic tape near the place at which the magnetic tape is positioned at the time concerned when the tape is initialized or formatted with specific DDRs. In either case, the region in which the directory data is recorded is the closest such region after (or before) the data position.

(2) For achieving the first object of mentioned above, the invention further provides the following methods of positioning, with respect to the read/write head, the region of the magnetic tape for recording directory data.

a. In the case of a cassette-type magnetic tape and subsystem which allows the tape to be loaded/unloaded with respect to the magnetic tape subsystem without rewinding the tape to the beginning, unloading of the tape from the magnetic tape subsystem is carried out with the tape positioned such that the magnetic tape head is positioned at the end of the latest directory data recorded in the directory data region. At the time of loading of the magnetic tape, the magnetic tape is rewound by the length of the directory data region to position it at the beginning of the directory data region (or the DDR can be reverse read without rewinding).

b. In the case of a magnetic tape subsystem equipped with a circuit for detecting tape position data of a specific pattern recorded on the tape, the detection being carried out when the tape travels at a high speed (the second speed) that is faster than the tape speed during data transfer (the first speed) the specific pattern data is recorded immediately before the directory data region on the tape. For positioning at the directory data region, the specific pattern data located immediately before the directory data region concerned is detected while the tape is being driven at the high second speed, whereafter positioning at the directory data region is effected.

The position of the specific pattern is set to be located ahead of the directory data region by a distanced equal to or greater than the distance travelled by the magnetic tape during the time required, following detection of the specific pattern data by the magnetic tape subsystem, for the tape travel speed to change from the second speed to the first speed and for data transfer to begin.

(3) For achieving the third object mentioned above, the invention further provides the following methods of determining the directory data region on the magnetic tape in which the latest directory data is recorded.

a. A region for a LATEST DATA FLAG is provided within the directory data region on the tape for indicating that the directory data in the region is the latest. When the directory data recorded in the directory data region of the tape is referred to (read), the latest data flag within the directory data region is reset, and when the latest directory data is recorded in the directory data region, the latest data flag with in the directory data region is set.

b. A region for an UPDATE COUNTER indicating the number of directory data updates is provided within the data region on the magnetic tape and the update counter value is incremented when directory data is recorded in the directory data region.

c. When the magnetic tape is loaded in the magnetic tape subsystem, the directory data region of the tape in which the latest directory data is stored is designated by the aforesaid LATEST DATA FLAG and when no directory data region of the tape has a LATEST DATA FLAG that is set, the directory data region in which the latest directory data is stored is determined from the UPDATE COUNTER value.

In the case of a cassette-type magnetic tape and a cassette-type magnetic tape subsystem which allows the tape to be loaded/unloaded with respect to the subsystem without rewinding the tape to the beginning, unloading of the tape is carried out with the read/write head at the end of the directory data region. At the time of loading of the magnetic tape, the magnetic tape is rewound by the length of the directory data region to find the directory data region whose LATEST DATA FLAG is set.

d. In the case where a memory for recording directory data is provided in the subsystem, the memory will be nonvolatile and will not lose the data should the power to the magnetic tape subsystem be cut off.

(4) For achieving the fourth object mentioned above, the invention provides the following methods for directory management.

a. The data storage region on the magnetic tape can be partitioned into a plurality of sub-regions. When a data storage region on the magnetic tape is partitioned into a plurality of sub-regions, the invention provides both a LATEST DATA FLAG for the entire magnetic tape (first LATEST DATA FLAG) and a LATEST DATA FLAG for each sub-region (second LATEST DATA FLAG). Also the invention provides both an UPDATE COUNTER for the entire magnetic tape (first UPDATE COUNTER) and an UPDATE COUNTER for each sub-region (second UPDATE COUNTER). When data on the tape loaded in the subsystem is accessed, a first type of directory data relating to the entire tape and a second type of directory data relating to the sub-region concerned is, in response to the completion of data process at the individual sub-region concern, recorded in a region near the place at which the magnetic tape head is positioned at the time the processing of data on the tape is completed.

b. Instead of causing magnetic tape directory data to be recorded in a region of the magnetic tape every time processing of data on the tape is completed, a memory for recording directory data is located in the magnetic tape subsystem for retaining directory data until it is needed for writing to the tape. A first type of directory data relating to the entire tape and a second type of directory data relating to the sub-region concerned is, in response to the completion of data processing at the sub-region, recorded in the directory data memory in the subsystem. When the magnetic tape is unloaded from the magnetic tape subsystem, the first type of directory data relating to the entire tape and the second type of directory data related to the sub-region at which the tape head is positioned just before the tape is unloaded are read from the directory data storage memory of the magnetic tape subsystem and recorded in a region of the tape near (closest to and after, in the preferred embodiment) the place at which the magnetic tape head is positioned just before unloading. When the magnetic tape is loaded, the magnetic tape is positioned at the directory data region where the latest directory data for the entire magnetic tape is stored based on the first LATEST DATA FLAG and the first UPDATE COUNTER, and the latest directory data is read therefrom and written to the directory data storage memory remote from the tape. When the magnetic tape is driven to position it at a second sub-region different from the first sub-region position at loading, a first type of directory data relating to the entire tape and a second type of directory data relating to the first sub-region are recorded in free regions closest to both the place at which the magnetic tape head was positioned before the tape was driven and nearest the place at which the magnetic tape head is positioned after the tape is driven. Two directories are written, one in each sub-region. When no directory data relating to the second sub-region is recorded in the memory of the magnetic tape subsystem, the second type of directory data in the latest directory data for the second sub-region is read from the second sub-region storing the same and written to the directory data storage memory of the magnetic tape subsystem.

c. The first type of directory data includes magnetic tape identifier and attribute data, magnetic tape use mode data and data relating to the position of the tape sub-regions and free areas. The second type of directory information includes identifier and free area data for the sub-regions and identifier, position and attribute data or data recorded in the sub-regions.

(5) For achieving the fifth object mentioned above, the invention partitions the data storage regions on the magnetic tape into sub-regions of the same fixed length. Data is stored relating to the durability of the tape at the individual fixed-length sub-regions, providing the tape with directory data relating to the number of tape passes at the individual sub-regions.

Since the invention does not require the directory data to be recorded at a specific part of the magnetic tape, it reduces the amount of tape winding and rewinding and shortens access time. In fact, since directory data regions need not be specified in advance, this data management system takes on some of the characteristics of a random access memory of the magnetic disk type.

Since the directory data is recorded near the accessed data in response to the completion of each data processing operation ("data processing operation" can mean a single data accessing or a series of accesses, after which directory data is written), the frequency of reading and writing at the parts of the tape where directory data is recorded is approximately the same as at other parts of the tape. The service life of the parts of the tape where directory data is recorded thus become about the same as that of the other parts.

In a configuration having a memory for recording directory data established in the subsystem, directory data does not have to be recorded on the magnetic tape after completion of an ordinary data processing operation so the amount of time required for recording directory data is further shortened and the probability of it becoming impossible to read/write in places at which directory data is recorded before it becomes impossible to read/write with respect to the other places, is reduced.

In the system using a cassette-type magnetic tape and a cassette-type subsystem which allows the tape to be loaded/unloaded with respect to the subsystem without rewinding the tape to the beginning, upon loading the magnetic tape in the magnetic tape subsystem, the tape can be rewound by the length of the directory data region to position it at the beginning of the DDR. Therefore, the time required for positioning the tape at the DDR is short. Further, when using a subsystem capable of conducting high speed searches for specific pattern data, since positioning at the directory data region can be achieved by a rapid search for the specific pattern data recorded immediately before the directory data region, the time required for positioning at the proper DDR is, once again, short.

Since the invention provides a LATEST DATA FLAG in the DDR on the magnetic tape, it is possible to position the tape where the latest directory data is recorded when the tape is reloaded in the magnetic tape subsystem after being once unloaded therefrom. Moreover, since the invention provides a directory data UPDATE COUNTER in the directory data region on the magnetic tape, it is possible to use the UPDATE COUNTER value for positioning at the region where the latest directory data is recorded, even in the case where a failure arose in the magnetic tape subsystem before the directory data was updated.

When the system partitions a data storage region on the tape into a plurality of sub-regions, it divides the directory data into a first type of directory data relating to the entire tape and a second type or directory data relating to a specific sub-region, and records the first and second type of directory data relating to the sub-regions in individual directory data regions on the tape. As a result, the amount of directory data recorded in the individual directory data regions on the tape is reduced, which, in turn, shortens the time required for input/output of directory data.

Further, the invention can partition the data storage regions on the tape into sub-regions of the same fixed length and can manage the system using the number of passes of the magnetic tape at the individual sub-divisions as directory data relating to the durability of the tape, thereby enabling tape region use that equalizes the number of passes among the different parts of the tape, thus preventing rapid deterioration of the tape.

The invention thus enables a digital VTR or other such high capacity memory subsystem to be used as the external storage subsystem of a computer system.

DESCRIPTION OF THE DRAWINGS

Further objects, features and advantages will become more clear from the following detailed description of the drawings, wherein.

DETAILED DESCRIPTION OF THE PREFERRED EMBODIMENT

Figure 1:
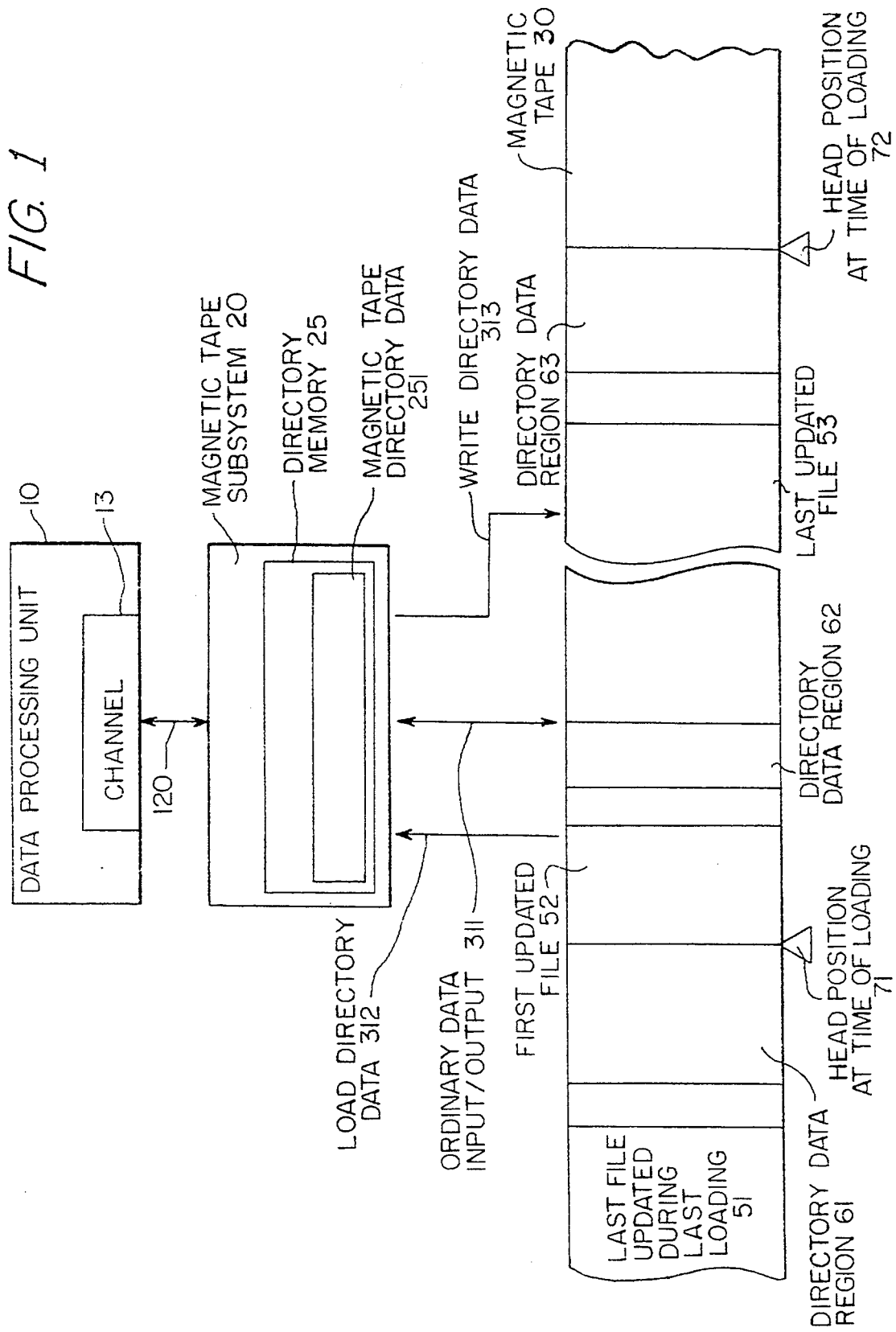
FIG. 1 is a schematic block diagram of a preferred embodiment of the invention.

FIG. 1 is a block diagram showing the overall configuration of a first embodiment. The computer system according to this embodiment has a magnetic tape subsystem 20 which allows the tape to be loaded/unloaded without rewinding the tape to the beginning, a typical example of such a subsystem being one that uses a digital video tape recorder (VTR) with large capacity cassette recording medium. The system includes data processing unit 10, channel 13, a directory memory 25, and magnetic tape 31.

Since the magnetic tape used in this embodiment has a large capacity, information relating to the position of the files on the tape is recorded as magnetic tape directory data and this position data is used for high-speed positioning at the desired file. For insuring the portability of the medium (the digital VTR tape), the directory data is recorded on the tape. As shown in FIG. 1, the magnetic tape 30 has a plurality of directory data regions (DDRs) 61, 62 and 63. When the directory data is to be updated owing to a file update, directory data is recorded in the nearest available directory data region or nearest available free tape space on the magnetic tape with respect to where the magnetic tape head of the subsystem 20 is positioned at that time.

A specific example of the magnetic tape 30 will now be explained.

Upon loading the magnetic tape 30 in the subsystem 20, the tape is positioned at the region where the latest directory data is recorded (at the directory data region 61 in this example). The head position at the time of loading the magnetic tape 31 (position 71) is at the end of directory data region 61 near (after or rearward of) the file 51 which is the final file updated when the tape was last loaded in the subsystem 20 or some other similar subsystem. This is because the last time the magnetic tape 30 was used in the subsystem 20 or some other subsystem, it was unloaded therefrom with the head of the subsystem positioned at 71 following completion of the data processing. Since this means that, at the time of loading, the magnetic tape subsystem 20 is positioned at the end of directory data region (DDR) 61 in which the latest directory data is recorded, it suffices to rewind the magnetic tape 30 by the length of the directory data region 61.

Next, as indicated by 312 in FIG. 1, the magnetic tape subsystem 20 loads the directory data 251 for magnetic tape 30 from the directory data region 61 to the directory memory 25 remote from the tape. The directory memory 25 is a memory circuit provided in the subsystem 24 for storing the directory data of the tape 30 loaded in the subsystem 20. After loading the directory data (312), the magnetic tape subsystem 20 accesses the magnetic tape 30 on the basis of the directory data 251 for carrying out ordinary data input/output as indicated by 311.

Following the completion of each file update processing operation conducted during the ordinary input/output (311), subsystem 20 updates directory data 251 in the directory memory 25 and also, as indicated by 313, can write the updated directory data 251 to a region on the magnetic tape near (just after) the place at which the magnetic tape is positioned at that time, this region constituting a directory data region (DDR). If, for instance, the first updated file 52 and the last updated file is 53, the magnetic tape subsystem 20 can write the directory data 251 to the associated directory data region 62 and 63 after each file 52, 53 is updated. In other words, the directory data information is written to the directory information area 62 for the first updated file and to the directory information area 63 for the last updated file.

Upon completion of the data processing with respect to the magnetic tape 30, the magnetic tape 30 is positioned at the end of the directory data region 63 near the most recently updated file. This is head position 72 and relates to the magnetic tape 30 unloading position.

Contrary to what was explained in the foregoing, it is alternatively possible to update only the magnetic tape directory data 251 in the directory data memory 25, without writing the updating data to the magnetic tape 30 after each file update. Also, while explanation was given only regarding file updating, it should be understood that, depending on the content of the directory data, similar processing is also necessary in the case of simply referring to a file. This will be explained in detail later.

Figure 2:
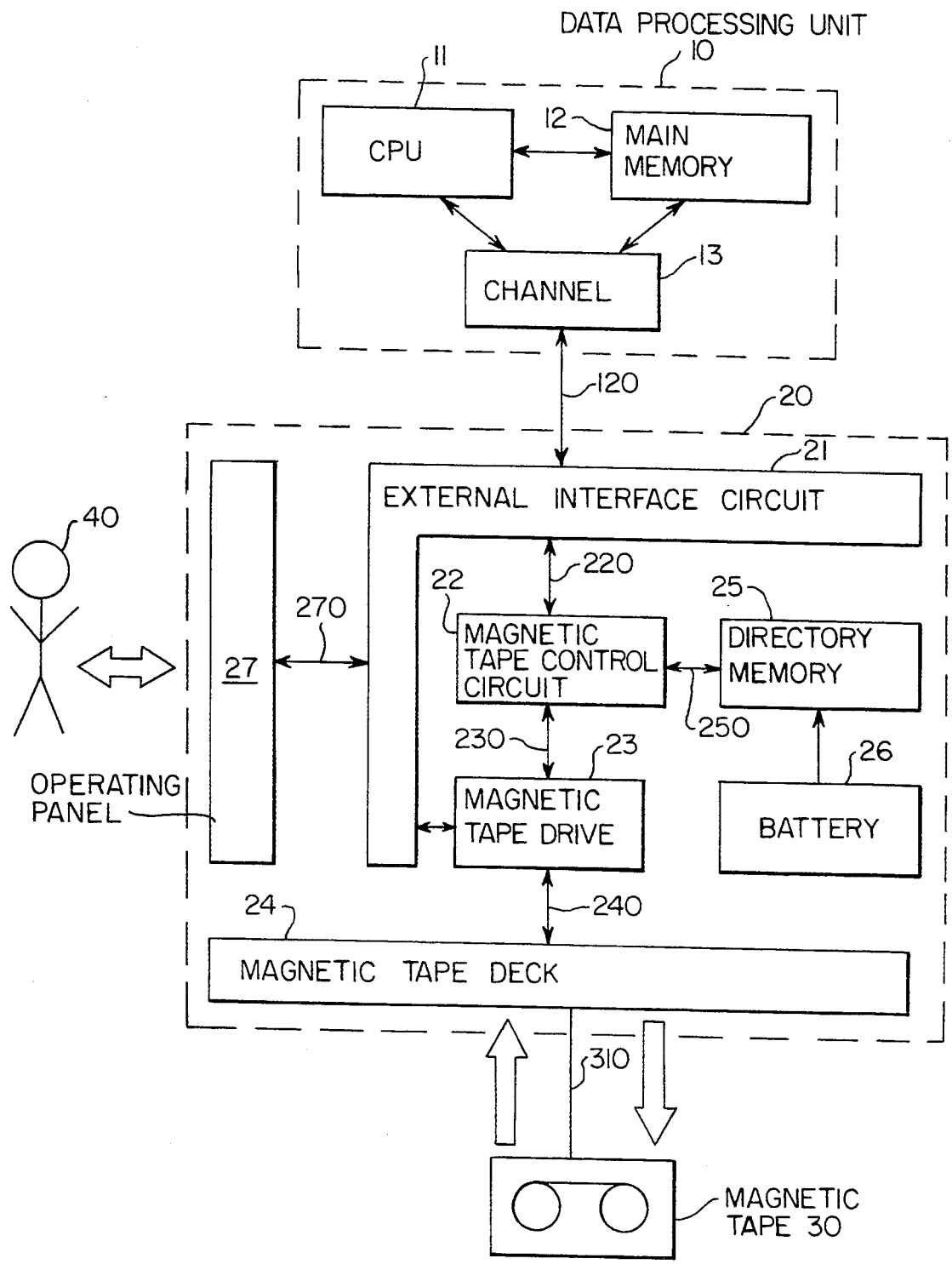
FIG. 2 is an explanatory block diagram of a computer system built around a magnetic tape subsystem according to the invention.

FIG. 2 is an explanatory block diagram of a computer system using a magnetic tape subsystem according to the present invention. As shown, the magnetic tape subsystem 20 is connected with the data processing unit 10.

Data processing unit 10 has CPU 11, main memory 12, and channel 13. CPU 11 performs computations, logical decision operations, and external and internal control operations necessary for controlling the overall computer system. The main memory 12 stores various data for processing by the CPU 11 and channel 13. The channel 13 controls the transfer of data between the main memory 12 and the magnetic tape subsystem 20.

The magnetic tape subsystem 20 has an external interface circuit 21, a magnetic tape control circuit 22 controlling a magnetic tape driver 23, a magnetic tape deck 24, directory memory 25, battery 26 for memory backup power in the event of power failure, and an operation panel 27. For simplifying the drawings of this embodiment, the multi-line signal lines between interconnected devices and circuits are not illustrated individually but are shown as single signal lines.

The external interface circuit 21 serves as an interface between the magnetic tape subsystem 20 and the channel 13 and as an interface with an operator 40 via the operation panel 27. Specifically, the external interface circuit 21 receives commands and data from the channel 13 via a signal line 120 and passes them to the magnetic tape control circuit 22 via a signal line 220. Also, via the signal line 220, it receives from the magnetic tape control circuit 22 various reports regarding, for example, response to commands and the state of the magnetic tape subsystem and passes these reports to the channel 13 on signal line 120. It further receives commands from the operation panel 27 via a signal line 270 and passes them to the magnetic tape control circuit 22 or the magnetic tape drive 23, and passes to the operation panel 27, via the signal line 270, the various messages it receives from the magnetic tape control circuit 22 on signal line 220 and from the magnetic tape drive 23 on signal line 260 regarding, for example, response to commands and the state of the magnetic tape subsystem 20.

Based on the commands it receives from the external interface circuit 21 via the signal line 220, the magnetic tape control circuit 22 forwards instructions to the magnetic tape driver 23 via a signal line 230, transfers data between the external interface circuit 21 and the magnetic tape driver 23 via signal line 220 and line 230 at the time of data input/output to a magnetic tape 30, and passes to the external interface circuit 21 on line 220 the various reports it receives from the magnetic tape driver 23 via signal line 230. For managing the magnetic tape 30 directory data, the magnetic tape control circuit 22 additionally stores the directory data concerned in the directory memory 25.

In accordance with instructions received from the magnetic tape control circuit 22 via the signal line 230 and instructions received from the operation panel 27, through the external interface circuit 21 via signal lines 260, 270, the magnetic tape drive 23 controls the magnetic tape deck 24 via signal line 240. It further receives various messages from the magnetic tape deck 24 via signal line 240 and passes them to the magnetic tape control circuit 22 via signal line 230 or to the external interface circuit 21 on signal line 260.

The magnetic tape deck 24 controls the operation of the magnetic tape 30 according to instructions received from the magnetic tape driver 23 via signal line 240 and also exchanges data with and makes various reports to the magnetic tape drive 23 on the same signal line. The directory memory 25 can be a semiconductor memory for storing directory data regarding the magnetic tape 30 loaded in the magnetic tape deck 24. When the ordinary power supply to the magnetic tape subsystem 20 is cut off, the battery 26 supplies power to the non-volatile semiconductor directory memory 25 so as to prevent loss of the directory data stored therein. The directory memory 25 and the battery 26 can be replaced by any other kind of non-volatile memory, for example, a small magnetic disk installed inside the subsystem 20.

The operation panel 27 is used by the operator 40 for directly inputting operating instructions to the magnetic tape subsystem 20 and also enables the operator to monitor the operating state of the subsystem 20.

As was explained earlier in the general description of the invention, the magnetic tape 30 and the magnetic tape subsystem 20 are of the cassette type allowing the tape to be loaded/unloaded with respect to the magnetic tape deck 24 without rewinding the tape to the beginning. The magnetic tape subsystem 20 has high-speed search capability. Specifically, it is configured so as to be able to detect specific pattern data when the magnetic tape deck 24 drives the magnetic tape at a speed higher than the speed it uses during ordinary data transfer.

The operation of the magnetic tape subsystem 20 of this embodiment will now be explained by breaking down this operation into various operating times, i.e., the time of tape initialization, the time of tape loading, the time of data processing with respect to the tape, the time of tape unloading, and the time of a magnetic tape subsystem failure.

Figure 3:
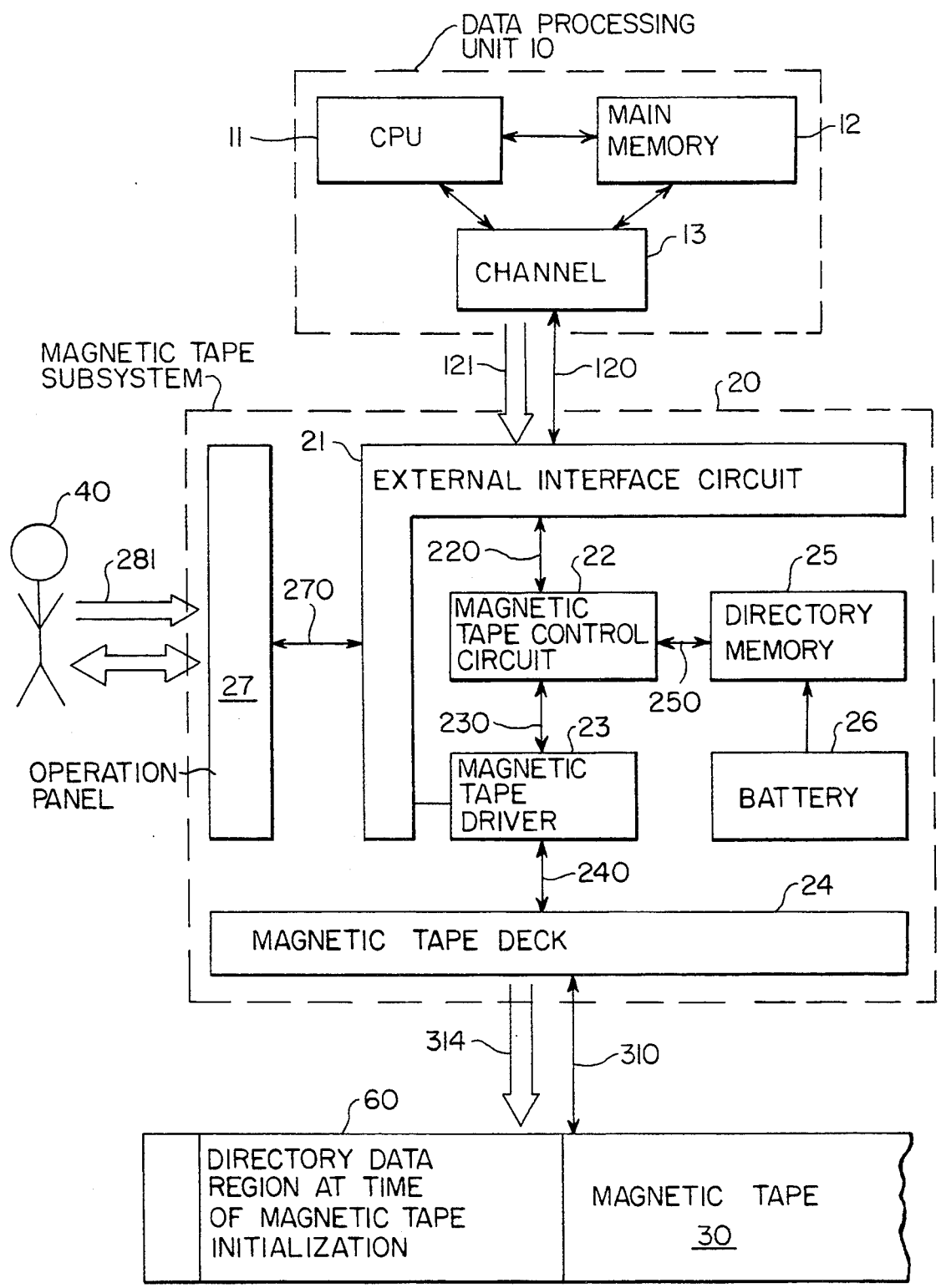
FIG. 3 is block diagram for explaining the operation of the magnetic tape subsystem of the invention at the time of initializing the magnetic tape.

1. Operation at the time of magnetic tape initialization (FIG. 3).

There are two ways in which a magnetic tape initialization request can be made. One is by the data processing unit 10 of the host system issuing a magnetic tape 30 initialization request 121 through the channel 13 and the signal line 120. The other is by the operator 40 inputting a magnetic tape 30 initialization request 281 through the operation panel 27. In either case, the external interface circuit 21 receives the magnetic tape 30 initialization request (on signal line 120 or 270) and passes it to the magnetic tape control circuit 22. Upon receiving the initialization request, the magnetic tape control circuit 22 creates a directory data region (DDR) 60 at the head of the magnetic tape 30 and carries out directory data initialization. Actually, the magnetic tape control circuit 22 sends instructions concerning the processing required for initialization to the magnetic tape drive 23 via line 230 and, based on these instructions, the magnetic tape drive 23 controls the operation of the tape deck 24 via signal line 240 so as to initialize the tape 30. Once the circuit or device in which such an operation originates is defined the path by which it is carried out is obvious. Therefore, explanation will be simplified hereinafter by specifying only the origin.

Figure 4:
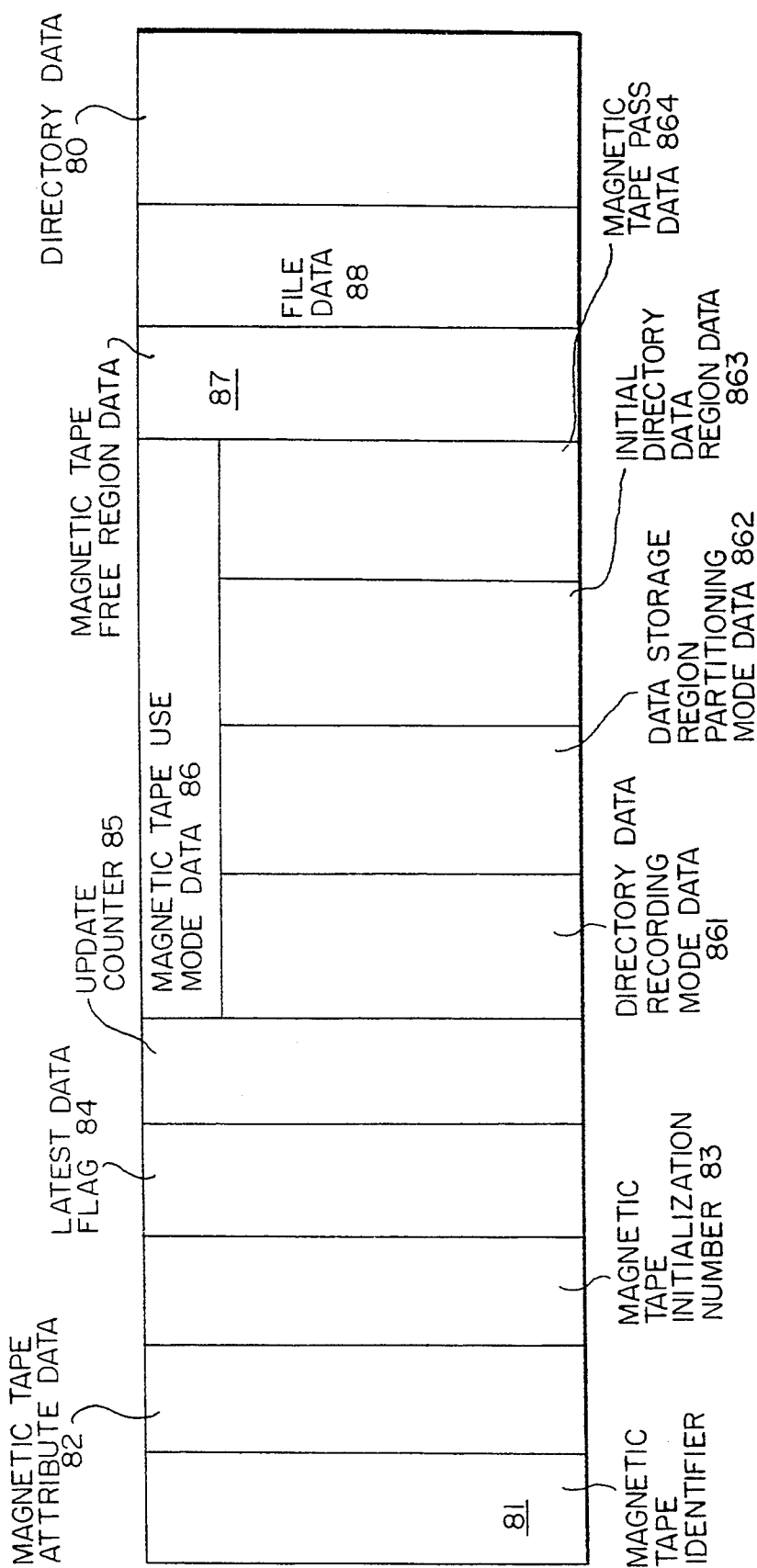
FIG. 4 is a diagram showing the makeup of directory data of the invention.

FIG. 4 shows the makeup of the directory data 80. The contents of the directory data 80 and the values which the magnetic tape control circuits 22 initializes on the basis of the contents of the initialization request 121 and 281 will now be explained. If the data storage region of the magnetic tape 30 is partitioned into sub-regions (see (f)(ii) below), a DDR 60 (FIG. 3) is created at the head of each sub-region and directory data initialization is carried out with respect thereto.

Contrary to what was explained in the foregoing, it is alternatively possible to create and initialize a directory information region for each sub-region at the time the sub-region is first used.

(a) Magnetic tape identifier (81)

The magnetic tape 30 has a specified identifier that is set for the particular type of tape used.

(b) Magnetic tape attribute data (82)

Various attribute data indicating the type of magnetic tape 30 is specified here. Attribute values are set.

(c) Magnetic tape initialization number (83)

The number of times the magnetic tape 30 has been initialized as recorded. It is set as the value for the proceeding initialization plus 1.

When a used tape is to be initialized, the old data is normally erased so that it will not be read by mistake. When a large capacity magnetic tape 30 is used, however, a long time is required for erasing it. The magnetic tape 30 is therefore logically initialized by recording the magnetic tape initialization number as part of the directory data 80 and no prior erasing is needed.

(d) LATEST DATA FLAG (84)

A flag indicating whether or not the directory data 80 recorded on the tape 30 is the latest directory data is recorded on the tape. If it has been designated that the data storage region on the magnetic tape 30 is to be partitioned into sub-regions (see (f)(ii) below), both a LATEST DATA FLAG for the entire magnetic tape (first LATEST DATA FLAG) and a LATEST DATA FLAG for each sub-region (second LATEST DATA FLAG) are established. The first LATEST DATA FLAG indicates whether or not the directory data 80 therein is the latest on the entire magnetic tape. On the other hand, the second LATEST DATA FLAG indicates whether or not the directory data 80 recorded in the directory data region is the latest in the sub-region which contains the directory data region. The flags are initially "ON" to indicate latest data.

(e) UPDATE COUNTER (85)

The update counter is a counter indicating how many times the directory data 80 stored in the directory data region on the magnetic tape has been updated. If it has been designated that the data storage region on the magnetic tape 30 is to be partitioned into sub-regions (see (f)(ii) below), both an UPDATE COUNTER for the entire magnetic tape (first UPDATE COUNTER) and an UPDATE COUNTER for each sub-region (second UPDATE COUNTER) are established. The initial values are zero.

(f) Magnetic tape use mode (86)
(i) Directory data recording mode (861)
This information indicates whether or not the directory data 80 is to be recorded on the magnetic tape 30 every time the directory data is updated. This is established by the mode indicated in the initialization request.
(ii) Data storage region partitioning mode data (862)
(1) Data storage region partitioning mode
This information designates whether or not the data storage region on the magnetic tape 30 is to be partitioned into a plurality of sub-regions. regions. This information is established by the mode indicated in the initialization request.
(2) Data Storage region sub-region length
This information designates the length of the individual sub-regions in the case where the data storage region is partitioned into a plurality of sub-regions. This information is established as the length indicated in the initialization request.
3) Sub-region use/nonuse
(iii) Initial directory data region data(863)
(1) Initial directory data region mode
Designates whether or not directory data regions are to be secured at fixed intervals in advance. This information is set as indicated in the initialization request.
(2) Directory data region interval
This information designates interval between directory data region when they are to be secured in advance. This information is set in the initialization request.
(iv) Magnetic tape pass data (864)
(1) Magnetic tape pass management mode
This information designates whether or not magnetic tape pass management is to be conducted for extending tape service life.
(2) Magnetic tape pass management unit
This information designates the length of the region constituting a management unit when magnetic tape pass management is to be conducted for extending tape service life.
(3) Magnetic tape pass
Designates that the passes for each aforesaid unit are to be recorded when magnetic tape pass management is to be conducted for extending tape service life. At first initialization, this value is set at zero for regions other than those passed during initialization. At the second and later initializations, the value is incremented from values already set. For regions passed during intialization the value is set at the aforesaid value plus the number of passes.

(g) Magnetic tape free region data (87)
Data regarding free regions within the magnetic tape 30 data storage region is magnetic tape free region data. If it has been designated that the data storage region is to be partitioned into a plurality of sub-regions, an identifier and free region data for each sub-region is recorded in the directory data region thereof. In the case of establishing a directory data region at the head of each sub-region and of securing directory data regions at fixed intervals in advance at the time of initialization (see (f)(iii) above), the directory data region, including the region immediately ahead of it in which specific pattern data is recorded, is recorded with the vales indicating that it is in use and that other regions are open.

(h) File information (88)
(1) File information including identifiers, position data, attribute data and the like relating to files stored on the magnetic tape 30 is file data. If it is to be designated that the data storage region is to be partitioned into a plurality of sub-regions (see (f)(ii) above), the file information for each sub-region containing the directory information region is recorded in the directory data region. The value is initially "no file" which indicates that there is no file.

(2) Operation at the time of magnetic tape loading (FIGS. 2 and 5)
As was explained earlier in the general description of the invention, at the time of loading, tape 30 is preferably positioned at the region recorded with the latest directory data and this latest directory data is loaded into the directory data memory by reverse-read operation or a short rewind and forward read operation. FIGS. 5a-5d show cases that can arise when the tape 30 is loaded in the magnetic tape subsystem 20. In these FIGS. 30-a to 30-d designate magnetic tape, 61-a to 61-d regions in which the latest directory data is stored, 71-a to 71-d the head position at the time of magnetic tape loading, and 91-a to 91-d specific pattern data for high-speed search positioned immediately ahead of the directory data regions. If it has been designated that the data storage region is to be partitioned into a plurality of sub-regions (see (f)(ii) above), the search for the latest directory data is conducted using the LATEST DATA FLAG for the entire magnetic tape (first LATEST DATA FLAG) and the UPDATE COUNTER for the entire magnetic tape (first UPDATE COUNTER). The following explanation will therefore be made on the presumption that the data storage is not partitioned.

Figure 5A:
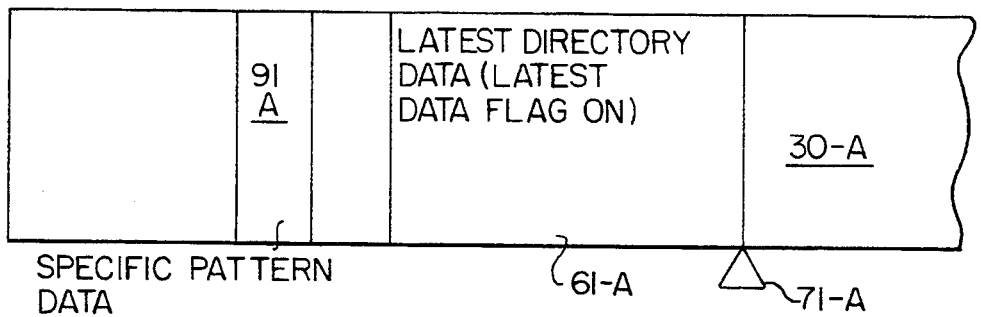
FIGS. 5a–5d are explanatory views showing the state of a magnetic tape according to the invention in its various possible configurations at the time the tape is loaded.

(a) The magnetic tape deck 24 detects the fact that the magnetic tape 30 has been loaded and so reports to the magnetic tape drive 23 via signal line 240. Upon receiving this message, the magnetic tape driver 23 passes it to the magnetic tape control circuit 22 via signal line 230. The magnetic tape control circuit 22 can instruct the magnetic tape driver 23, via signal line 230, to reverse-read the magnetic tape 30 over the length of the directory data region 61 or to rewind the tape a distance equal to the DDR and forward read the DDR. In response to this instruction, the magnetic tape deck 24 reads the directory data from this section of the magnetic tape. The read data is sent to the magnetic tape control circuit 22 via the magnetic tape drive 23 and is written to the directory memory 25 in the control circuit 22. In the case of FIG. 5(a), the data written to the directory memory 25 in the foregoing manner has its LATEST DATA FLAG 84 ON. The loading of the latest directory data to the directory data memory is thus complete.

Figure 5B:
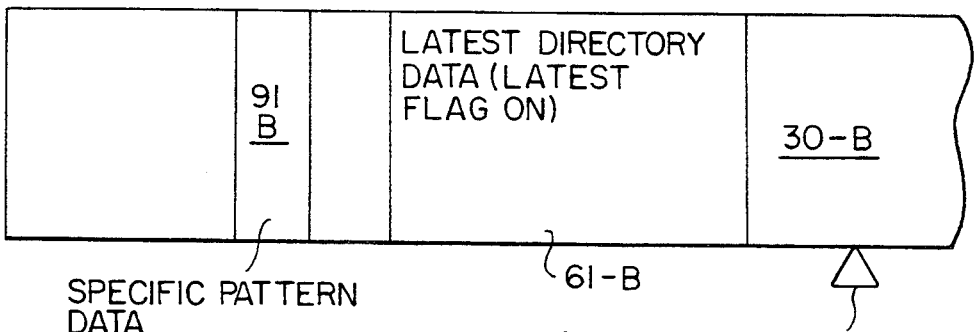

(b) While the situation is almost always that illustrated in FIG. 5(a), different situations may occur because of a subsystem 20 failure or of winding of the magnetic tape 30 after it is removed from the tape deck 24. In such situations, the subsystem 20 conducts a high-speed search of the magnetic tape 30 in the reverse direction for locating region 61 containing the latest directory data. More specifically, the magnetic tape control circuit 22 instructs the magnetic tape drive 23 via the signal line 230 to conduct a reverse high-speed search of the specific pattern data recorded immediately after (before in reverse direction) directory data regions. In response, the magnetic tape deck 24 detects specific pattern data (e.g. 91-b in FIG. 5) and so reports to the magnetic tape control circuit 22 via the tape drive 23. Upon receiving this report, the magnetic tape control circuit 22 issues an instruction for reading of the magnetic tape 30 in the forward direction. In response, the tape deck 24 reads the directory data from a DDR (e.g. 61-b in FIG. 5). The read directory data is sent to the magnetic tape control circuit 22 via the magnetic tape drive 23. If the LATEST DATA FLAG (84) is on, the magnetic tape control circuit 22 writes the directory data to the directory memory 25. If the LATEST DATA FLAG (84) is off, the magnetic tape control circuit 22 checks whether the UPDATE COUNTER (85) value of the read directory data is newer than the UPDATE COUNTER (85) value of the directory data written in the memory 25 and, if it is, writes the read directory data to the directory memory 25. The search for the latest directory data is continued up to the beginning of the magnetic tape 30. In the case of FIG. 5(b), the latest directory data is obtained by reading the directory data from the directory data region 61-b associated with the specific pattern data 91-b.

Figure 5C:
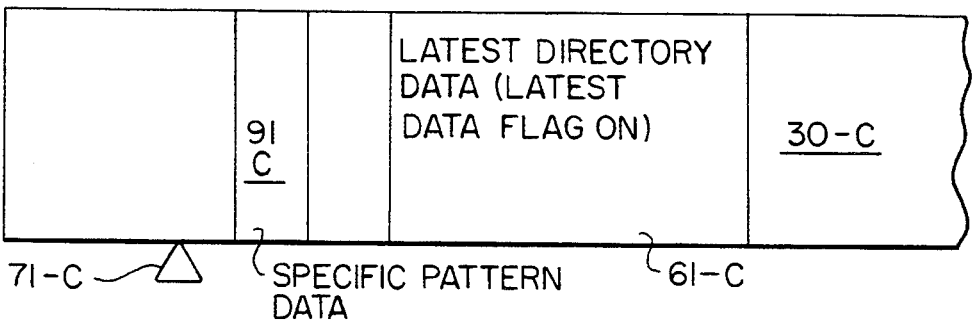

(c) If in (b) above, the magnetic tape control circuit 22 searches to the beginning of the tape without finding directory data whose LATEST DATA FLAG (85) is on, the tape is wound to the position at the time of its loading in the magnetic tape deck 24 and a search for the latest directory data similar to that of (b) above is conducted in the forward direction to the end of the tape. In the case of FIG. 5(c), the latest directory data is obatin by reading the directory data from the directory data region 61-c associated with the specific pattern data 91-c.

Figure 5D:
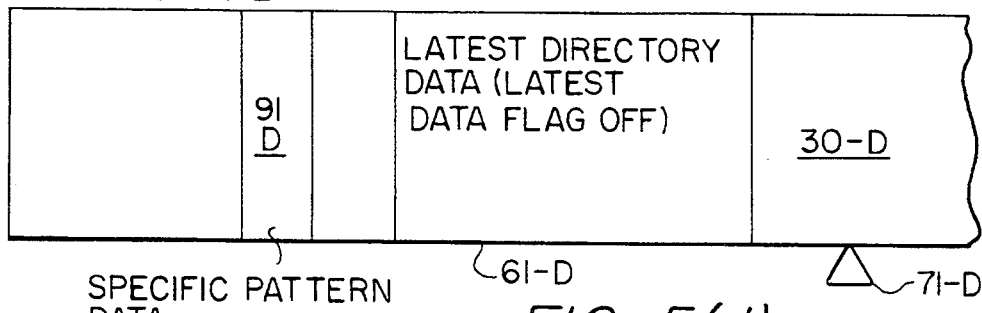

(d) In the case like that illustrated in FIG. 5(d), the procedure according to (c) above will not enable the magnetic tape control circuit 22 to locate directory data whose LATEST DATA FLAG (84) is on even if the search is continued up to the end of the tape because there is no LATEST DATA FLAG on tape set to ON. In this case, the directory data written in the directory memory 25, is, from the fact that its UPDATE COUNTER (85) value is the newest, judged to be the latest.

(e) As a result of 5(a)–(d) above, the latest directory data is loaded into the directory data memory 25. In 5(a)–(c), when the directory data whose LATEST DATA FLAG (84) is on is loaded, the LATEST DATA FLAG (84) is turned OFF.

When it is designated at the time of initialization that tape pass management is to be conducted for extending the tape service life, (see 1(f)(iv) above) the number of passes at each pass management unit of the magnetic tape 30 is counted during the processing according to 5(a)–(d) above and the magnetic tape pass value and the magnetic tape pass data (864) of the directory date 80 is incremented accordingly.

Figure 6:
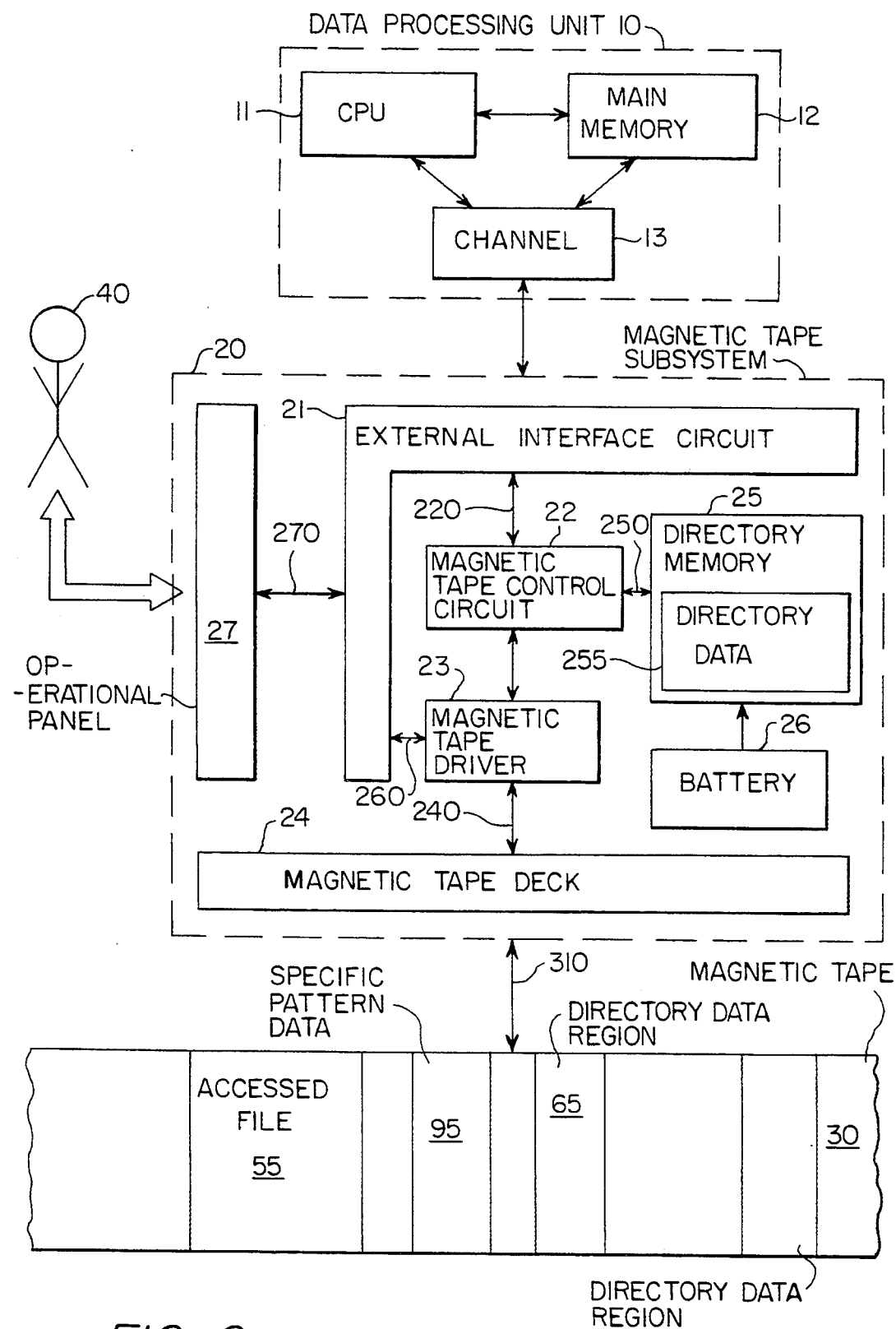
FIG. 6 is a block diagram for explaining the operation of the magnetic tape subsystem of the invention at the time data on the tape is processes.

(3) Operation at the time of data processing (FIG. 6)

File processing related to the present invention is carried out as follows:

(a) Positioning of tape at proper file

Upon being informed by the data processing unit 10 via the external interface circuit 21 that access of a file 55 on the magnetic tape 30 is desired, the magnetic tape control circuit 22, referring to the file data 88 of FIG. 4 of directory data 255, positions the magnetic tape 30 at the beginning of the file 55 to be accessed. Or, if the file 55 is to be newly created, the magnetic tape control circuit circuit 22 allocates a region (either predetermined or random) for the file 55, referring to the magnetic tape free region data (87) of the directory data 255. At this time, if tape pass management is being conducted for extending the service life of the magnetic tape 30 (see 1(f)(iv) above), the free region to be allocated is selected so that access thereof does not increase the maximum pass value, in this way avoiding deterioration of the magnetic tape 30.

In the directory data recording mode (861) calling for recording of the directory data 80 on the magnetic tape 30 every time the directory data is updated, before the magnetic tape is positioned at the beginning of the file 55, the LATEST DATA FLAG (84) in the directory information region where the directory information was recorded at the time of file access proceeding accessing the file 55, is turned OFF.

Further, when it was designated at the time of initialization that the data storage region on the magnetic tape 30 it to be partitioned, file access causes shifts between sub-regions. In this case, the sub-region prior to the shift is processed in the same way as the magnetic tape 30 is processed at the time of unloading except that the LATEST DATA FLAG for the entire magnetic tape (first LATEST DATA FLAG) is reset. The sub-region after the shift is processed in the same way as the magnetic tape 30 is processed at the time of loading except that when no directory data relating to the second sub-region is recorded in the directory memory of the magnetic tape subsystem, the second type directory data in the latest directory data for the second sub-region is read from the directory data region in the second sub-region and written to the directory memory of the magnetic tape subsystem. At that time, magnetic tape control circuit 22 searches the directory data region where the latest directory data for the second sub-region is stored, using the LATEST DATA FLAG for the sub-region (second LATEST DATA FLAG) and the UPDATE COUNTER for the sub-region (second UPDATE COUNTER).

(b) Update of directory data

Upon being informed by the data processing unit 10 via external interface circuit 22 that access of a file 55 on the magnetic tape 30 has been completed, the tape control circuit 22 renews the directory data 255 stored in the memory 25. In the directory data recording mode (861), which calls for recording of the directory data 80 on the magnetic tape 30 every time the directory data is updated, the magnetic tape control circuit 22 writes directory data 255 from the directory memory 25 to a DDR on the magnetic tape 30. In the case where DDR's were secured in advance at the time of initialization, the region the magnetic tape control circuit 22 now selects for writing the directory data 255 is the first directory data region after the place at which the magnetic tape head is positioned at the time access of the magnetic tape file is completed (DDR's 65 or 66 in FIG. 6, directory data region 65 in the case at hand). When directory data regions are not secured in advance, the system selects the first free tape after the place at which the magnetic head is positioned at the time access to the file is completed. In either case, moreover, the magnetic tape control circuit 22 writes specific pattern data 95 for high speed directory data searching immediately ahead of the directory data region 65. The position at which the specific pattern is written is selected to be ahead of the directory data region 65 by a distance slightly greater (by 10–50%) than the distance traveled by the magnetic tape 30 during the time required, following detection of the specified pattern data by the magnetic tape subsystem, for the tape travel speed to change from the second speed to the first speed and for data transfer to begin.

The items of directory data 255 that are updated are as follows:

(i) Update Counter

The update counter is incremented by one.

(ii) Tape Pass

If it was designated at the time of tape initialization that tape pass management is to be conducted for extending the magnetic tape service life, the number of passes at each pass management unit on the magnetic tape 30 during the file access is counted and the magnetic tape pass value is incremented accordingly.

(iii) Free Region Data

If any change has occurred in the allocated regions owing to file creation or file updating, the change is reflected in the free region data.

(iv) File Data

Any new file created is recorded. If the region allocated to a file has changed owing to updating, the file position data is changed accordingly.

(v) Other

The latest data flag is always ON. Therefore, when directory data 255 is written to a region on the magnetic tape 30, the latest data flag of the region concerned is turned ON.

Figure 7:
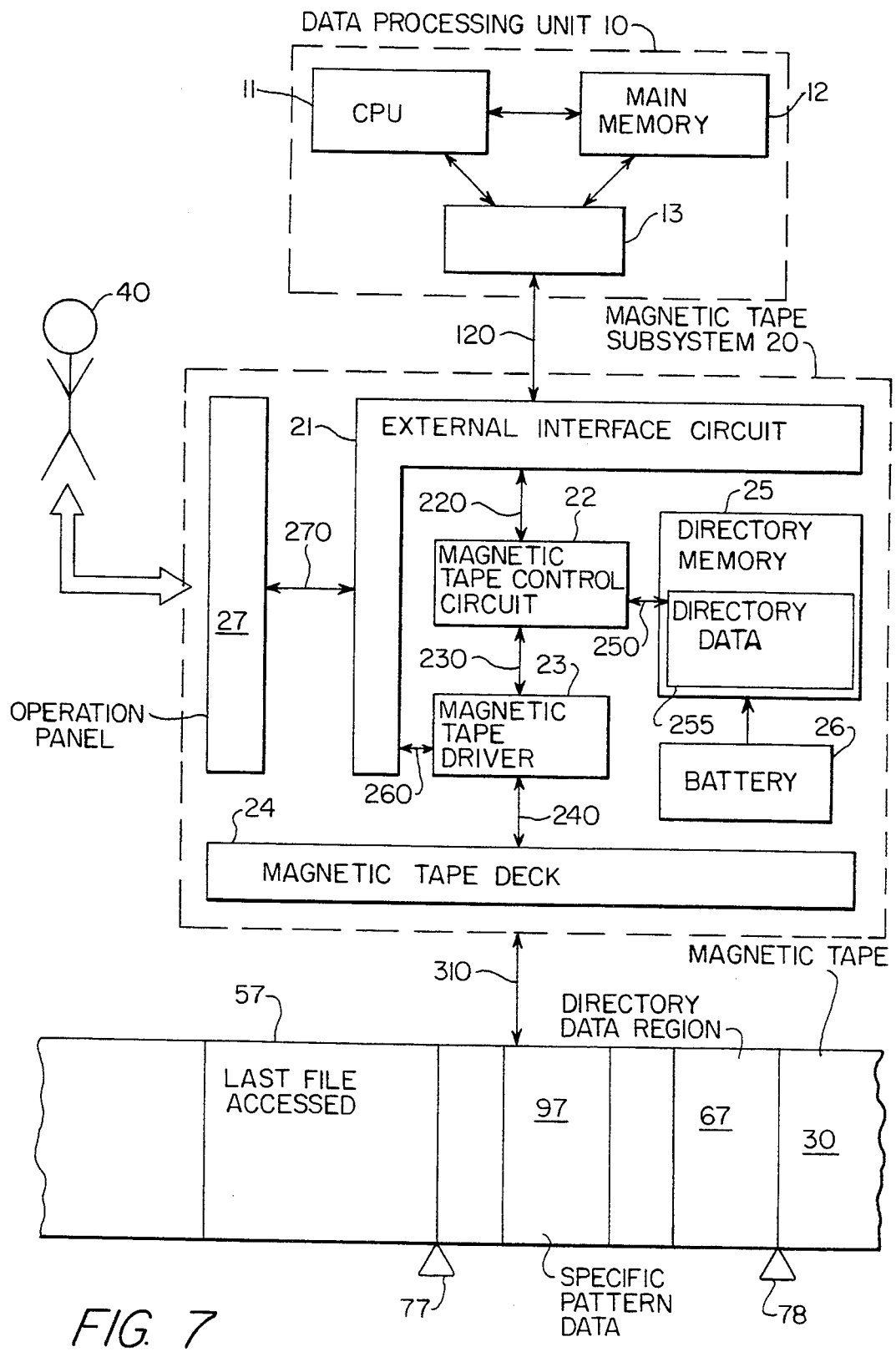
FIG. 7 is a block diagram for explaining the operation of the magnetic tape subsystem of the invention at the time the tape is unloaded.

(4) Operation at the time of magnetic tape unloading (FIG. 7).

Upon receiving a command to unload the magnetic tape 30 from the subsystem 20, coming either from the CPU 11 of the data processing unit 10 via channel 13 and signal line 120 or from the operator 40 via the operation panel 27 and the signal line 270, the external interface circuit 21 passes the command onto the magnetic tape control circuit 22. Referring to the tape directory data 255 stored in the directory memory 25, the magnetic tape control circuit 22 discriminates whether or not it has been designated in the directory data recording MODE data that the directory data is to be recorded on the tape every time directory data 255 is renewed.

When it has been designated that the aforesaid directory data is to be recorded on the magnetic tape 30, this means that after processing of the last file accessed 57 on the magnetic tape 30 has been completed, the directory data 255 has been written to the magnetic tape 30 at the directory data region 67 closest (immediately after) the last accessed file 57 and that the corresponding specific pattern data 97 has been recorded immediately ahead of the directory data region 67. There is therefore no need to newly write the directory data 255 to the magnetic tape 30.

On the other hand, when writing of the aforesaid directory data to the magnetic tape 30 after each data processing has not been designated, this means that after processing the last file accessed 57 on the magnetic tape 30 has been completed, the directory data 255 has not been written to the magnetic tape 30 and that magnetic tape head is positioned at the end 77 of the last file accessed 57. In this case, the magnetic tape control circuit 22, by the same procedures as in 3(b) above, writes the directory data 255 to the magnetic tape 30 at the directory data region 67 immediately after the last file accessed 57 and writes the corresponding specific pattern data 97 immediately ahead of the directory data region 67.

In either case, the magnetic tape head becomes positioned at the end 78 of the directory data region 67.

The magnetic tape control circuit 22 next frees the region of the directory memory 25 storing the directory data 255. Magnetic tape control circuit 22 then instructs the magnetic tape driver 23 via the signal line 230 to unload the magnetic tape 30 from the tape deck 24 with the magnetic tape 30 in the position at that time (i.e. in the position where the magnetic tape head is located at the end 78 of the directory data region 67). Upon receiving this instruction, the magnetic tape driver 23 sends a similar instruction to the magnetic tape deck 24 via the signal line 240. In response to this instruction from the magnetic tape drive 23, the magnetic tape deck 24 ejects the magnetic tape 30 for removal by the operator.

Figure 8:
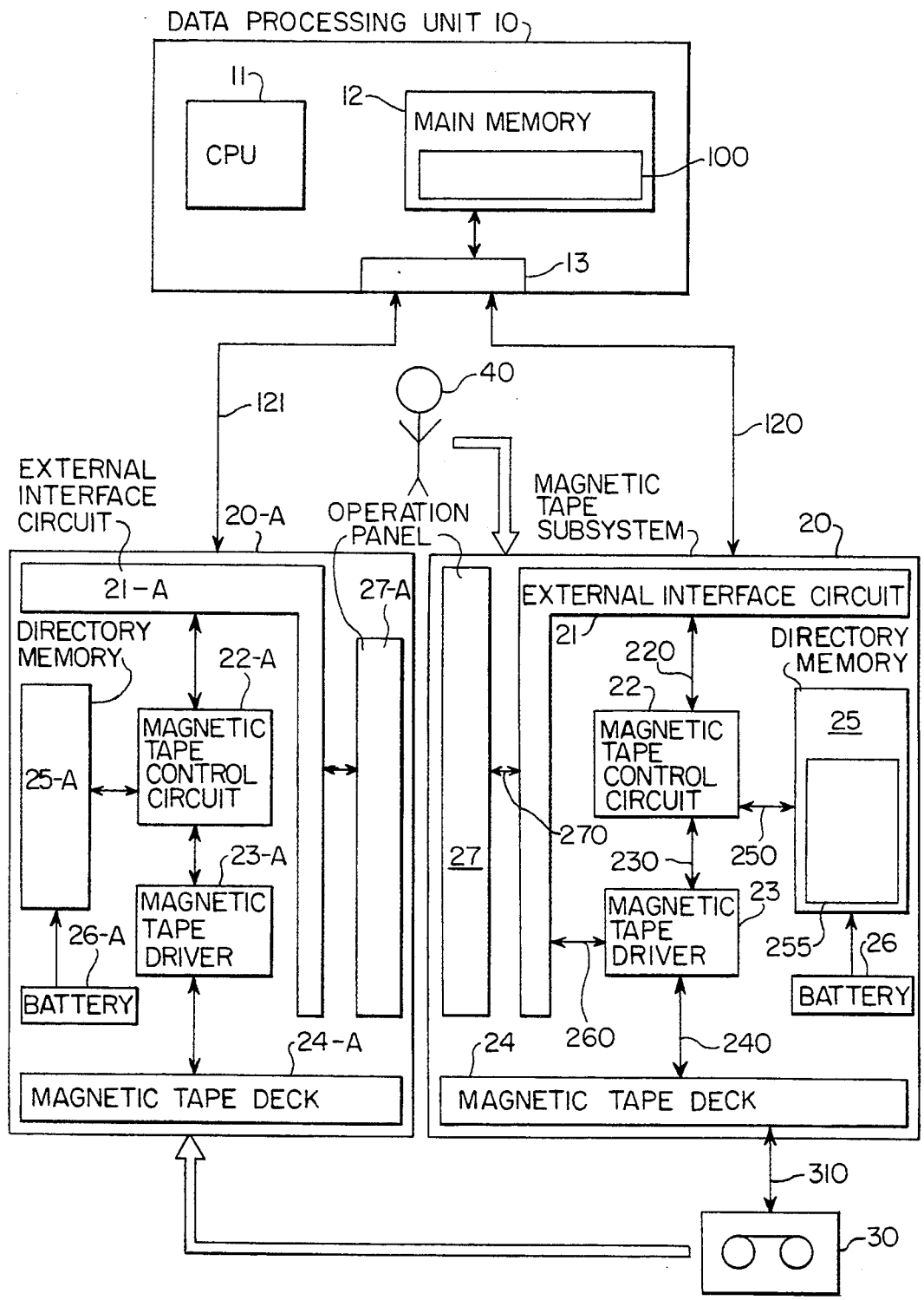
FIG. 8 is a block diagram for explaining the operation of the magnetic tape subsystem according to the invention at the time of failure of the magnetic tape subsystem.

(5) Operation at the time of magnetic tape subsystem failure (FIG. 8).

The recovery procedures by the data processing unit 10 will now be explained with reference to FIG. 8. When a failure has occurred in the magnetic tape driver 23, the magnetic tape control circuit 22 or the like of the subsystem 20, the magnetic tape control circuit 22 receives a failure report which it passes to the external interface circuit 21 via the signal line 220. The external interface circuit 21 reports the failure to the channel 13 via signal line 120 and to the operator panel 27 via the signal line 270. Upon learning the details of the failure from what is indicated on the operation panel 27, the operator 40 determines whether reading of the directory memory is possible and, if it is, runs a recovery program 100 in the data processing unit 10 for the tape 30. The recovery program 100 instructs the operator 40 to load the magnetic tape 30 in a separate magnetic tape subsystem 20-a and also instructs the magnetic tape subsystem 20 to load the directory data 255 for the magnetic tape 30 stored in the directory memory 25 to the main memory 12. After the operator 40 loads the magnetic tape 30, the magnetic tape subsystem 20-a carries out load processing with respect to the magnetic tape 30 in the previously described manner. The recovery program 100 further requests recovery of the directory data for the magnetic tape 30 and sends the directory data 255 loaded from the directory data memory 25 to the magnetic tape subsystem 20-a. Upon receiving the directory data recovery request, the magnetic tape subsystem 20-a writes the directory data 255 for the magnetic tape 30 received from the recovery program 100 to a directory memory 25-a to be used as directory data for a newly loaded magnetic tape 30. As a directory data recovery option at this time, an instruction can be given for the recovered directory data to be written to the magnetic tape 30, in which case the directory data 255 written to the directory memory 25-a is further written to the magnetic tape 30.

Thus, even in the case of a magnetic tape subsystem using a large capacity medium, this invention enables high-speed access of the data on the medium while also protecting against loss of the data on the medium even during failure of the magnetic tape subsystem. This system has some of the attributes of a random access system and is a greatly improved version of the known magnetic tape data storage systems.

While in the embodiment just described the magnetic tape control circuit 22 and the magnetic tape drive 23 are both part of the magnetic tape subsystem 20, either or both can alternatively be provided as units independent from the external interface circuit 21 and the magnetic tape deck 24.

The magnetic tape subsystem 20 in this embodiment is preferably a magnetic tape subsystem using a digital VTR, preferably a helical scan type magnetic tape subsystem having the necessary interface circuit, tape control circuit, memory, and memory backup power.

When applied to a magnetic tape subsystem using a large capacity recording medium, the present invention shortens the time required for recording directory data on the tape as well as the access time during directory data update and reference. This serial access system more closely emulates a random access memory in terms of speed than prior art serial systems.

When applied to a magnetic tape subsystem using a large capacity recording medium, it also enables directory data to be recorded on the magnetic tape in a manner ensuring that read/write to the part(s) of the tape at which the directory data is recorded will be possible for approximately the same period (tape service life) that it is possible to read/write normally with respect to other portions of the magnetic tape, even in the case where the durability of the medium is inferior to that of the magnetic tape conventionally used in a computer system.

Moreover, in a case where the magnetic tape is located in a different magnetic tape subsystem from that used for recording the directory data or where read/write is conducted with respect to a magnetic tape using a magnetic tape subsystem that becomes faulty before the recording of directory data to the tape is conducted, the invention makes it possible to properly position the tape with respect to the read/write head at the place where the latest valid directory data is stored and to read the latest directory data.

The invention also enables the amount of directory data to be reduced thus shortening the time required for input/output of directory data.

By ensuring uniform use of all portions of the magnetic tape, the invention further prevents rapid deterioration thereof, even in the case where the durability of the medium is inferior to that of the magnetic tape conventionally used in computer systems.

Furthermore, in the case where a failure has occurred in the magnetic tape drive, magnetic tape deck or some other component of the magnetic tape subsystem, the invention makes it possible, by running a recovery program and transferring the magnetic tape to another magnetic tape subsystem, to recover and continue using the directory data for the magnetic tape.

While a preferred embodiment has been set forth along with modifications and variations to show specific advantageous details of the present invention, further embodiments, modifications and variations are contemplated within the broader aspects of the present invention, all as set forth by the spirit and scope of the claims.

We claim:

1. A magnetic tape data management method for use in a magnetic tape data storage system where the magnetic tape has plural data regions and plural directory data regions, and, further including a magnetic tape subsystem capable of reading from and writing to said magnetic tape through a tape head with said tape loaded in said subsystem, the method comprising the steps of;

accessing data files in at least one of said data regions on said magnetic tape loaded in said magnetic tape subsystem;

processing said accessed data;

recording new directory data in a directory data region closest to the place at which said magnetic tape head is positioned with respect to the tape at the time of completion of the processing of said data; and repeating said step of recording to write a directory data region for each data file accessed and processed so that plural directory data regions are recorded on said tape, said recording unrelated to removal of said tape from said subsystem.

2. A magnetic tape data management method for use in a magnetic tape data storage system where the magnetic tape has plural data regions and plural directory data regions, and, further including a magnetic tape subsystem capable of reading from and writing to said magnetic tape through a tape head, the magnetic tape subsystem further including a directory data memory, the method comprising the steps of;

recording mode data in said directory on said magnetic tape indicating whether or not directory data is to be recorded in the directory data region on the magnetic tape each time the directory data is updated, in order to initialize said magnetic tape prior to its use as a storage medium;

loading said magnetic tape in said magnetic tape subsystem;

reading the latest directory data from the region where it is stored on said magnetic tape;

writing the latest directory data from said magnetic tape to said directory data memory in the magnetic tape subsystem;

accessing data in at least one of said data regions on said magnetic tape loaded in said magnetic tape subsystem;

processing said accessed data;

recording directory data in both the directory data memory of the magnetic tape subsystem and in the directory data region closest to the place at which said magnetic tape head is positioned with respect to the tape at the time of completion of the processing of said date if said mode data indicates that directory data is to be recorded directory data region on the magnetic tape each time the directory data is updated, otherwise, recording directory data in directory memory of the magnetic tape subsystem without recording in the directory data region of the magnetic tape;

reading the directory data from said directory data memory just before unloading said magnetic tape from said magnetic tape subsystem and recording said directory data in the directory data region closest to the place which said magnetic tape head is positioned with respect to the tape at the time of completion of said processing of said data set, if said mode data does not indicate that directory data is to be recorded in the directory data region on the magnetic tape each time the directory data is updated; and unloading said magnetic tape from said magnetic tape subsystem.

3. A magnetic tape data management method according to claim 2, further comprising the steps of;

providing a latest directory data flag in the directory data region on said magnetic tape for indicating that the directory data recorded in said region is the latest directory data; and, resetting the latest data flag in the directory data region on said magnetic tape when reference is made to said directory data recorded in the directory data region and;

setting the latest data flag in the directory data region when said latest directory data is recorded in said directory data region.

4. A magnetic tape data management method according to claim 3 further comprising the steps of;

providing an update counter region in said directory data region on said magnetic tape for indicating the number of updates of said directory data; and, incrementing said update counter value each time said directory data is recorded on said magnetic tape.

5. The magnetic tape data management method according to claim 4 comprising the steps of;

determining the directory data region on said magnetic tape which contains the latest directory data from said latest data flag just after the magnetic tape is loaded in the magnetic tape subsystem; and, when no latest data flag is in any directory data region on said magnetic tape, reading said update counter values and finding the highest counter value to determine the directory data region on said magnetic tape which contains said latest directory data.

6. The magnetic tape data management method according to claim 4 wherein said magnetic tape and said magnetic tape subsystem are of the cassette type that allow the magnetic tape to be loaded and unloaded without rewinding the magnetic tape to the beginning, comprising the steps of;

unloading said magnetic tape from said magnetic tape subsystem with said magnetic tape positioned with respect to the magnetic tape head at the place where directory data is recorded; and, loading said magnetic tape in said magnetic tape subsystem;

rewinding said magnetic tape by the length of said directory data region to search for the directory data region whose latest data flag is set; and, when no directory data region whose latest data flag is set is found on said magnetic tape, searching said entire magnetic tape to determine the latest directory data from said update counter values.

7. The magnetic tape data management method according to claim 1 characterized in that the steps of recording new directory data include recording magnetic tape identifier and attribute data, magnetic tape free region data, and recording file information including identifiers, position data, and attribute data relating to said data files.

8. A magnetic tape data management method for use in a magnetic tape data storage system where the magnetic tape has plural data file regions and plural directory data regions, and, further including a magnetic tape subsystem capable of reading from and writing to said magnetic tape through a tape head, said subsystem further having a directory data memory, the method comprising the steps of;

partitioning said data regions of said magnetic tape into a plurality of subregions;

accessing a data file in one of said subregions on said magnetic tape loaded in said magnetic tape subsystem;

processing said accessed data in said one of said subregions;

updating directory data in said directory data memory of said magnetic tape subsystem in response to completion of said processing of said data, said directory data including a first type of directory data relating to each of said subregions on the entire magnetic tape and a second type of directory data relating to said one of said subregions; and in response to finishing said accessing concerning with said one of said subregions, reading said directory from said directory data memory, and recording said directory data in a directory data region closest to the place at which said magnetic tape head is positioned with respect to the tape at the time of said finishing said accessing.

9. The magnetic tape data management method of claim 8 further comprising the steps of;

reading from the directory data memory in said magnetic tape subsystem the first and second types of directory data just before the magnetic tape is unloaded from said magnetic tape subsystem;

recording said first and second types of data in a directory data region located near the place at which the magnetic tape head is positioned just before said magnetic tape is unloaded;

unloading said magnetic tape;

loading said magnetic tape at some future time into said magnetic tape subsystem;

reading the latest directory data from said magnetic tape and writing said latest directory data in said directory data memory in the magnetic tape subsystem just after said magnetic tape is loaded;

if the position of said magnetic tape has changed within the cassette so that it is positioned at a second subregion instead of a first subregion, recording said first type of directory data relating to the entire magnetic tape and said second type of directory data related to the first subregion at a free region of the magnetic tape near the place at which the magnetic tape head is positioned just before said change of position if said directory data exists in said memory and, if said directory data for said second subregion is not recorded in the directory data memory of the magnetic tape subsystem after the position change, reading the latest directory data from said second subregion for storing the latest directory data and writing said second type of directory data of said latest directory data for said second subregion in said directory data memory in said magnetic tape subsystem.

10. The magnetic tape data management method according to claim 9 further comprising the steps of;

initializing said magnetic tape, said step of initializing comprising recording mode data in said directory data region on said magnetic tape indicating that the directory data is to be recorded in said directory data region on said magnetic tape each time said directory data is updated;

accessing data in at least one of said data subregions on said magnetic tape loaded in said magnetic tape subsystem;

processing data sets of said accessed data in said subregions; and, recording a first type of directory data relating to the entire magnetic tape and a second type of directory data relating to said subregions in said directory data recording region on said magnetic tape closest to the place at which said magnetic tape head is positioned with respect to the tape at the time of completion of said processing of said data set if said recording mode data indicates that directory data is to be recorded with each update.

11. The magnetic tape data management method according to claim 10 further comprising the steps of;

providing a first latest directory data flag and a second latest directory data flag in said directory data region in said subregion on said magnetic tape, wherein said first latest directory data flag indicates that the directory data in said region is the latest data on the entire magnetic tape and said second latest directory data flag indicates that the directory data in said region is the latest directory data in the subregion managed by the directory data;

resetting said latest data flags in said directory data regions when reference is made to said directory data recorded in said directory data region in said subregion; and setting such latest data flags in said directory data region in said subregion when said latest directory data is recorded in said directory data region.

12. The magnetic tape data management method according to claim 11 further comprising the steps of;

providing first update counters indicating the number of updates of said directory data in said entire magnetic tape and second update counters indicating the number of updates of said directory data in said individual subregions on said magnetic tape; and, incrementing said update counter values when directory data is recorded in said subregions of said directory data regions.

13. The magnetic tape data management method according to claim 12 further comprising the steps of;

determining from said first latest data flag that said directory data region being near said magnetic tape head just after said magnetic is loaded into said magnetic tape subsystem contains said latest directory data;

determining from said first latest data flag which said directory data region in said magnetic tape contains said latest directory data when said directory data region being near said magnetic tape head just after said magnetic is loaded into said magnetic tape subsystem does not contain said latest directory data; and determining which said directory data region in said subregion contains the latest directory data by using said first update counter values when no directory data region having its latest data flag set is present in the subregion.

14. The magnetic tape data management method according to claim 12 wherein said magnetic tape and said magnetic tape subsystem are of the cassette type that allow said magnetic tape to be loaded or unloaded with respect to said magnetic tape subsystem without rewinding said magnetic tape to the beginning, said magnetic tape positioned at unloading such that said magnetic tape head is positioned with respect to said latest directory data in the directory data region on said magnetic tape, comprising the steps of;

rewinding said magnetic tape the distance of a directory data region to search for directory data having said first latest data flag set, and, searching the entire magnetic tape when no directory data region is present whose first latest data flag is set to find said directory data region which contains the latest directory data determined by said first update counter values.

15. The magnetic tape data management method according to claim 8 characterized in that the step of storing that in said first type of directory data includes storing magnetic tape identifier and attribute data, magnetic tape use mode data, and magnetic tape subregion position and free region data, and, storing the second type of directory data relating to a subregion includes storing identifier and free region data for the subregion and identifier and position data and attribute data for data files recorded in said subregion.

16. The magnetic tape data management method according to claim 2 characterized in that said step storing the directory data memory in said magnetic tape subsystem includes storing said directory data in a non-volatile memory device that will not lose data should power to the magnetic tape subsystem be cut off.

17. A magnetic tape data management method according to claim 1 characterized in that said steps of recording new directory data in a directory region include recording said new directory data in the first free region after the place at which the magnetic tape head is positioned at the time said directory data is to be recorded.

18. The magnetic tape data management method according to claim 1 further comprising the steps of;

partitioning said data storage regions on said magnetic tape into subregions of a fixed length; and, including in said directory data, as data relating to the durability of said magnetic tape at individual fixed length subregions, data on the number of tape passes of individual subregions past said head.

19. A magnetic tape data management method according to claim 1 wherein said magnetic tape subsystem is equipped with a circuit for detecting specific pattern data recorded on said magnetic tape when said magnetic tape is driven at a second speed faster than a first tape speed used during data transfer, comprising the further steps of;

recording said specific pattern data immediately before said directory data region on said magnetic tape, and, driving said magnetic tape at said second speed, detecting said specific pattern data located immediately before said directory data region; and, positioning said magnetic tape at said directory data region.

20. The magnetic tape data management method according to claim 19 characterized in that said specific pattern data recorded immediately before said directory data region on said magnetic tape is recorded at a position ahead of said directory data region by a distance equal to or greater than the distance traveled by said magnetic tape during the time required following detection of said specific pattern data by said magnetic tape subsystem for said magnetic tape travel speed to change from said second speed to said first speed and for data reading or writing to begin.

21. The magnetic tape data management method according to claim 2 characterized in that said step of recording directory data in said magnetic tape subsystem memory includes recording in a non-volatile memory device that will not lose data should power to the magnetic tape subsystem be cut off.

22. The magnetic tape data management method according to claim 8 characterized in that said step of storing includes storing said first and second type of directory data in a magnetic tape subsystem non-volatile memory device that will not lose data should power to the magnetic tape subsystem be cut off.

23. The magnetic tape data management method according to claim 9 characterized in that said step reading the latest directory data in said magnetic tape subsystem memory includes reading from a non-volatile memory device that will not lose data should power to the magnetic tape subsystem be cut off.

24. In a magnetic tape data management system for storing data employing a magnetic tape subsystem which includes a magnetic tape deck having at least one magnetic head, a magnetic tape drive, a magnetic tape controller for controlling operations of said magnetic tape drive, and an external interface circuit for interfacing with a host system or an operation panel, said magnetic tape controller comprising:
  means for accessing data in at least one of said data regions on said magnetic tape loaded in said magnetic tape drive;
  means for processing said accessed data; and
  means for recording directory data for said magnetic tape in a region of said magnetic tape located closest to and after the place at which said magnetic tape head is positioned at the time a message, from said interface circuit is received indicating that said external interface circuit has been informed by the host system that current data processing with respect to said data in said at least one of said data regions on said magnetic tape has been completed, said region at which said directory data has been recorded constituting a directory data region.

25. In a magnetic tape data management system employing a first magnetic tape subsystem including a magnetic tape deck, a magnetic tape drive, at least one magnetic head, a magnetic tape controller for controlling operations of said magnetic tape drive, and an external interface circuit for interfacing with a host system or an operation panel, and a directory data memory for recording directory data related to said tape, said magnetic tape subsystem further comprising;
  recording means for recording directory data for said magnetic tape in said directory data memory in response to a message received from said external interface unit informing said magnetic tape controller that said external interface unit has been informed by said host system or said operation panel that data processing with respect to said magnetic tape has been completed;
  means for reading directory data from said directory data memory;
  means for recording said directory data in a region on said magnetic tape located closest to and after the place at which said magnetic tape head is positioned just before said magnetic tape is unloaded from said magnetic tape subsystem, said region constituting a latest directory data region;
  means for reading latest directory data from said latest directory data region on said magnetic tape in response to a tape loading message received from said magnetic tape drive; and,
  means for writing said latest directory data in said directory data memory.

26. The magnetic tape subsystem according to claim 25 wherein said magnetic tape controller further comprises;
  means for recording mode data in said directory data region indicating whether or not said directory data is to be recorded on said magnetic tape every time said directory data is renewed, said mode data recorded in response to a message received from said external interface circuit informing said magnetic tape controller that said external interface circuit has received a magnetic tape initialization request;
  means for discriminating whether or not said mode data indicates that said directory data is to be recorded on said magnetic tape every time said directory data is renewed; and,
  means for recording said directory data in both said directory data memory and in a directory data region located closest to and after the place at which said magnetic tape head is positioned at the time of said discrimination if the result of said discrimination is affirmative.

27. The magnetic tape subsystem according to claim 25 further comprising;
  a latest data flag provided in said directory data region for indicating that the directory data recorded in said region is the latest directory data; and wherein,
  said magnetic tape controller further comprises means for resetting said latest data flag in said directory data region when reference is made to said directory data in said directory data region; and,
  means for setting said latest data flag in said directory data region when said latest directory data is recorded in said directory data region.

28. The magnetic tape subsystem according to claim 27 further comprising;
  an update counter in said directory data region for indicating the number of updates of said directory data on said magnetic tape; and,
  wherein said magnetic tape controller further comprises means for incrementing said update counter value when directory data is recorded in said directory data region.

29. The magnetic tape subsystem according to claim 28 wherein said magnetic tape controller further comprises;
  means for determining from said latest data flag which directory data region on said magnetic tape contains said latest directory data in response to a tape loading message received from said magnetic tape drive; and,
  means for determining from said update counter values which one of said directory data region on the magnetic tape contains the latest directory data when no directory data region whose latest data flag is set is present on said magnetic tape.

30. The magnetic tape subsystem according to claim 28 wherein said subsystem is a cassette type magnetic tape subsystem that allows said magnetic tape to be loaded and unloaded with respect to said subsystem without rewinding said magnetic tape to the beginning; and, said magnetic tape controller further comprising means for instructing said magnetic tape drive to unload said magnetic tape in the positional state of the magnetic tape at the time said directory data was recorded in the directory data region on said magnetic tape in response to a message received from said external interface circuit informing the magnetic tape controller that said external interface circuit has received an instruction from said host system or from said operation panel to unload said magnetic tape from said magnetic tape deck; and, means for rewinding said magnetic tape by the length of said directory data region to search for the directory data region whose latest data flag is set in response to a tape loading message received from said magnetic tape drive;

means for searching the entire magnetic tape to find the directory data region whose latest flag is set; and means for searching the entire magnetic tape and determining which directory data region contains said latest directory data by reading said update counter values when no directory data region is present on said magnetic having its latest data flag set.

31. The magnetic tape subsystem according to claim 25 wherein said directory data includes magnetic tape identifier and attribute data, magnetic tape free region data, as well as identifier and position data and attribute data.

32. The tape management subsystem according to claim 24 wherein said magnetic tape controller comprises means for partitioning said data storage regions on said magnetic tape into a plurality of subregions; and, means for recording a first type of directory data relating to the entire magnetic tape and a second type of directory data for said subregions on a region located closest to and after the place in the subregion at which said magnetic tape head is positioned at the time of recording in response to a message received from said external interface circuit, said region constituting a directory data region.

33. In a magnetic tape subsystem including a magnetic tape deck, a magnetic tape drive, at least one magnetic head, a magnetic tape controller for controlling operations of said magnetic tape drive, a directory data memory for storing directory data for said magnetic tape, and an external interface circuit for interfacing with the host system or an operation panel, a magnetic storage medium having data storage regions and directory data regions for use with said magnetic tape subsystem, said magnetic tape subsystem further comprising;

means for partitioning said data storage regions on said magnetic tape into a plurality of subregions;

means for recording in said directory data memory a first type of directory data related to the entire magnetic tape and a second type of directory data related to individual said subregions, said recording means acting in response to a message received from said external interface circuit informing said magnetic tape controller that said external interface circuit has been informed by said host system or said operation panel that data processing with respect to said subregions on said magnetic tape has been completed;

means for reading from said directory memory said first type of directory data and said second type of directory data relating to the subregion at which said magnetic head is positioned just before said magnetic tape is unloaded;

means for recording said first and second types of data in a directory data region located closest to and after the place on said magnetic tape at which said magnetic head positioned just before said magnetic tape is unloaded, said region constituting a directory data region;

means for reading the latest directory data from the directory data region and for writing said directory data in the directory data memory, both in response to a tape loading message received from the magnetic tape drive, and, means for recording and reading if the position of said magnetic tape has changed within the cassette because of tape travel so that it is positioned at a second subregion where it was positioned before the tape travel, said recording means recording said first type of directory data relating to said entire magnetic tape and the second type of directory data relating to said first subregion near the place at which said magnetic head was positioned before said tape travel, said region constituting a directory data region, and if said directory data for said second subregion is not recorded in said directory memory after said tape travel, reading said latest directory data for said second subregion from said second subregion for storing the directory data and writing said latest directory data for said second subregion in said directory memory.

34. The magnetic tape subsystem according to claim 33 wherein said magnetic tape controller further comprises means for recording mode data in said directory data region on said tape indicating whether or not said directory data is to be recorded on said magnetic tape every time said directory data is renewed, said recording accomplished in response to a message received from said external interface circuit informing the magnetic tape controller that said external interface circuit has received a magnetic tape initialization request; and, means which discriminate whether or not said mode data indicates that said directory data is to be recorded on said magnetic tape every time said directory data is renewed; and, means for recording said first type of directory data related to the entire magnetic tape and the second type of directory data related to subregions in both the directory memory in said subsystem and in a region of said magnetic tape located closest to and after the place at which the magnetic tape head is positioned at the time data processing is complete when the result of said discrimination is affirmative, said region comprising a directory data region and said discriminating means and said recording means acting in response to a message received from said external interface circuit informing said magnetic tape controller that said external interface circuit has been informed by said host processor or said operation panel that data processing with respect to said subregions on said magnetic tape has been completed.

35. The magnetic tape subsystem according to claim 33 further comprising;
means for recording a first latest directory data flag and a second latest directory data flag in said directory data region, wherein said first latest directory data flag indicates that the directory data in said region is the latest directory data on said magnetic tape and said second latest directory data flag indicates that the directory data in said region is the latest directory data in said subregions; and,
wherein said magnetic tape controller further comprises means for resetting said latest data flags in said directory data region when reference is made to said directory data recorded in said directory data region; and,
means for setting said latest data flags in said directory data region when said latest directory data is recorded in said directory data region.

36. The magnetic tape subsystem according to claim 35 wherein said directory data regions on said magnetic tape are provided with regions for first update counters indicating the number of updates of said directory data in said entire magnetic tape and second update counters indicating the number of updates of said directory data in the individual subregions and wherein said magnetic tape controller further comprises means for incrementing said update counter values when directory data is recorded in said directory data regions.

37. The magnetic tape subsystem according to claim 36 wherein said magnetic tape controller further comprises means for determining which directory data region contains the latest directory data by reading the first latest data flag in response to a tape loading message received from said magnetic tape drive, and, when no directory data region whose first latest flag is set is present on the magnetic tape, said determining means determines from said first update counter values which directory data region in the magnetic tape contains said latest directory data.

38. The magnetic tape subsystem according to claim 36 wherein said magnetic tape subsystem is of a cassette type that allows said magnetic tape to be loaded and unloaded with respect to the magnetic tape subsystem without rewinding said magnetic tape to the beginning; and,
wherein said magnetic tape controller further comprises means for unloading said magnetic tape in the positional state of said tape at the time said directory data was recorded in said directory data region, said means for unloading acting in response to a message received from said external interface circuit informing said magnetic tape controller that said external interface circuit has received an instruction from said host system or said operation panel to unload said magnetic tape from the magnetic tape deck; and,
means for rewinding said magnetic tape by the length of a directory data region to search for said directory data region in said subregion in which said first latest data flag is set; and,
means for reading said entire magnetic tape when no directory data region whose said first latest data flag is set is present in said entire magnetic tape, to determine which said directory data region contains the latest directory by reading said first update counter values.

39. The magnetic tape subsystem according to claim 32 wherein said first type of directory data includes magnetic tape identifier and attribute data and magnetic tape subregion position and free region data, and said second type of directory data relating to a subregion includes identifier and free region data for said subregion as well as identifiers, position data, and attribute data relating to said data recorded in said subregion.

40. A magnetic tape subsystem according to claim 25 wherein said data directory memory in said magnetic tape subsystem is non-volatile and will not lose data should power to the magnetic tape subsystem be cut off.

41. A magnetic tape data management system according to claim 24 wherein said directory data region on said magnetic tape is the first free region after the place at which the magnetic tape head is positioned at the time said directory data is to be recorded.

42. The magnetic tape subsystem according to claim 24 wherein said magnetic tape controller further comprises means for establishing a plurality of directory data regions on said magnetic tape in response to a message received from said external interface circuit informing said magnetic tape controller that said external interface unit has received a magnetic tape initialization request, the directory data region nearest the place at which said magnetic tape head is positioned at the time said directory data is to be recorded to selected as the region for recording said directory on said magnetic tape.

43. The magnetic tape subsystem according to claim 42 wherein the first said directory data region after the place at which said magnetic tape is positioned at the time the directory data is to be recorded is selected as the region for recording directory data on said magnetic tape.

44. The magnetic tape subsystem according to claim 24 wherein said magnetic tape controller further comprises;
means for partitioning said data storage region on said magnetic tape into subregions of a fixed length; and,
means for recording, as part of said directory data, the number of tape passes at said individual subregions, the recorded number of tape passes constituting data related to the durability of said magnetic tape at the individual fixed length subregions.

45. The magnetic tape subsystem according to claim 24 wherein said magnetic tape subsystem further comprises;
circuit means for detecting specific pattern data recorded on said magnetic tape when said magnetic tape is driven at a high second speed that is faster than a first tape speed used during data transfer; and,
wherein said magnetic tape controller further comprises means for recording specific pattern data immediately before said directory data region on said magnetic tape; and,
means for driving said magnetic tape at said second speed at the time of positioning at said directory data region,
means for detecting specific pattern data positioned immediately before said directory data regions and,
means for positioning said magnetic tape at said directory data region.

46. The magnetic tape subsystem according to claim 45 wherein said specific pattern data recorded immediately before said directory data region is recorded at a position ahead of said directory data region by a distance equal to or greater than the distance travelled by said magnetic tape during the time required for said magnetic tape travel speed to change from said second speed to said first speed following detection of said specific pattern by the magnetic tape subsystem and for data transfer to begin.

47. The magnetic tape subsystem according to claim 46 characterized in that the said magnetic tape subsystem head is a helical scan type magnetic head.

48. The magnetic tape subsystem according to claim 25 wherein said first magnetic tape subsystem is augmented by a second magnetic tape subsystem so that the magnetic tape subsystem comprises a first and second magnetic tape subsystem;

means for detecting a failure of said first subsystem and reporting said failure from said external interface circuit to said host system or said operation panel;

means for transferring said directory data from the directory memory in said first subsystem to said host system; and, means for writing said directory data from said host system to the directory in said second magnetic tape subsystem in response to a message received from said external interface circuit and said second magnetic tape subsystem that the host system has received an instruction to restore said directory data of said magnetic tape now loaded in said magnetic tape deck of said second magnetic tape subsystem.

49. A magnetic tape subsystem according to claim 26 wherein said directory data memory in said magnetic tape subsystem is nonvolatile and will not lose data should power to the magnetic tape subsystem be cut off.

50. A magnetic tape subsystem according to claim 33 wherein said directory data memory in said magnetic tape subsystem is nonvolatile and will not lose data should power to the magnetic tape subsystem be cut off.

51. A magnetic tape subsystem according to claim 34 wherein said data directory memory in said magnetic tape subsystem is nonvolatile and will not lose data should power to the magnetic tape subsystem be cut off.

* * * * *